US009832170B2

United States Patent
Bharadhwaj et al.

(10) Patent No.: US 9,832,170 B2
(45) Date of Patent: *Nov. 28, 2017

(54) APPLICATION ACCELERATION AS A SERVICE SYSTEM AND METHOD

(71) Applicant: Aryaka Networks, Inc., Newark, CA (US)

(72) Inventors: Rajeev Bharadhwaj, Saratoga, CA (US); Ajit Gupta, Fremont, CA (US); Ashwath Nagaraj, Los Altos Hills, CA (US)

( * ) Notice: Subject to any disclaimer, the term of this patent is extended or adjusted under 35 U.S.C. 154(b) by 163 days.

This patent is subject to a terminal disclaimer.

(21) Appl. No.: 14/862,172

(22) Filed: Sep. 23, 2015

(65) Prior Publication Data

US 2016/0014079 A1    Jan. 14, 2016

Related U.S. Application Data

(63) Continuation of application No. 14/529,132, filed on Oct. 30, 2014, now Pat. No. 9,191,369, which is a (Continued)

(51) Int. Cl.
*H04L 29/06* (2006.01)
*G06Q 10/10* (2012.01)
(Continued)

(52) U.S. Cl.
CPC .......... *H04L 63/029* (2013.01); *G06Q 10/10* (2013.01); *H04L 12/4633* (2013.01);
(Continued)

(58) Field of Classification Search
CPC .............. H04L 63/029; H04L 63/0272; H04L 63/0485
See application file for complete search history.

(56) References Cited

U.S. PATENT DOCUMENTS 5,263,157 A    11/1993  Janis
5,586,260 A    12/1996  Hu
(Continued)

FOREIGN PATENT DOCUMENTS

WO          0025214 A1    5/2000
WO       2011008419 A2    1/2011
(Continued)

OTHER PUBLICATIONS

"Akamais Application Acceleration Services:Transform the Internet into a Business-Ready Application Delivery Platform"; Akamai Technologies, Inc. ; Oct. 2008 (pp. 12).
(Continued)

*Primary Examiner* — David Pearson
(74) *Attorney, Agent, or Firm* — Raj Abhyanker, P.C.

(57) ABSTRACT

Disclosed are systems and methods to provide application acceleration as a service. In one embodiment, a system includes a head office to serve an enterprise application comprised of a collaborative document. The system also includes a branch office to request the collaborative document from the head office. The enterprise application may also include a computed document and/or a static document. In addition, the system also includes a set of Point of Presence (POP) locations between the head office and the branch office to communicate the collaborative document, the computed document and the static document on behalf of the head office from a closest POP location to the head office to a closest POP location to the branch office and then onward to the branch office.

15 Claims, 15 Drawing Sheets

Related U.S. Application Data continuation of application No. 13/919,018, filed on Jun. 17, 2013, now Pat. No. 8,903,918, which is a continuation of application No. 12/550,409, filed on Aug. 31, 2009, now Pat. No. 8,489,685.

(60) Provisional application No. 61/226,407, filed on Jul. 17, 2009.

(51) Int. Cl.
    *H04L 12/46* (2006.01)
    *H04L 29/08* (2006.01)

(52) U.S. Cl.
    CPC ...... *H04L 63/0227* (2013.01); *H04L 63/0236* (2013.01); *H04L 63/0272* (2013.01); *H04L 63/0281* (2013.01); *H04L 67/10* (2013.01); *H04L 67/327* (2013.01); *H04L 69/04* (2013.01)

(56) References Cited

U.S. PATENT DOCUMENTS

| | | |
|---|---|---|
| 5,764,887 A | 6/1998 | Kells et al. |
| 5,765,153 A | 6/1998 | Benantar et al. |
| 5,864,665 A | 1/1999 | Tran |
| 5,915,087 A | 6/1999 | Hammond et al. |
| 5,968,176 A | 10/1999 | Nessett et al. |
| 5,983,350 A | 11/1999 | Minear et al. |
| 6,088,451 A | 7/2000 | He et al. |
| 6,112,228 A | 8/2000 | Earl et al. |
| 6,131,163 A | 10/2000 | Wiegel |
| 6,158,007 A | 12/2000 | Moreh et al. |
| 6,158,010 A | 12/2000 | Moriconi et al. |
| 6,202,157 B1 | 3/2001 | Brownlie et al. |
| 6,209,077 B1 | 3/2001 | Robertson et al. |
| 6,233,612 B1 | 5/2001 | Fruchtman et al. |
| 6,292,904 B1 | 9/2001 | Broomhall et al. |
| 6,460,141 B1 | 10/2002 | Olden |
| 6,484,261 B1 | 11/2002 | Wiegel |
| 6,499,107 B1 | 12/2002 | Gleichauf et al. |
| 6,513,061 B1 | 1/2003 | Ebata et al. |
| 6,542,993 B1 | 4/2003 | Erfani |
| 6,594,763 B1 | 7/2003 | Madoukh |
| 6,606,708 B1 | 8/2003 | Devine et al. |
| 6,704,874 B1 | 3/2004 | Porras et al. |
| 6,715,084 B2 | 3/2004 | Aaron et al. |
| 6,745,245 B1 | 6/2004 | Carpenter |
| 6,748,540 B1 | 6/2004 | Canestaro et al. |
| 6,782,527 B1 | 8/2004 | Kouznetsov et al. |
| 6,789,202 B1 | 9/2004 | Ko et al. |
| 6,826,615 B2 | 11/2004 | Barrall et al. |
| 6,876,654 B1 | 4/2005 | Hegde |
| 6,880,005 B1 | 4/2005 | Bell et al. |
| 6,920,558 B2 | 7/2005 | Sames et al. |
| 6,980,989 B2 | 12/2005 | Silverman et al. |
| 7,003,117 B2 | 2/2006 | Kacker et al. |
| 7,093,283 B1 | 8/2006 | Chen et al. |
| 7,093,297 B2 | 8/2006 | Moore |
| 7,117,195 B2 | 10/2006 | Chantrain et al. |
| 7,127,492 B1 | 10/2006 | Calo et al. |
| 7,134,137 B2 | 11/2006 | Joshi et al. |
| 7,140,035 B1 | 11/2006 | Karch |
| 7,146,640 B2 | 12/2006 | Goodman et al. |
| 7,150,038 B1 | 12/2006 | Samar |
| 7,178,164 B1 | 2/2007 | Bonnes |
| 7,185,364 B2 | 2/2007 | Knouse et al. |
| 7,210,167 B2 | 4/2007 | Brezak et al. |
| 7,231,661 B1 | 6/2007 | Villavicencio et al. |
| 7,237,125 B2 | 6/2007 | Raley et al. |
| 7,246,230 B2 | 7/2007 | Stanko |
| 7,272,613 B2 | 9/2007 | Sim et al. |
| 7,308,716 B2 | 12/2007 | Danford et al. |
| 7,318,237 B2 | 1/2008 | Moriconi et al. |
| 7,346,775 B2 | 3/2008 | Gasparinl et al. |
| 7,392,546 B2 | 6/2008 | Patrick |
| 7,444,414 B2 | 10/2008 | Foster et al. |
| 7,451,488 B2 | 11/2008 | Cooper et al. |
| 7,467,410 B2 | 12/2008 | Graham et al. |
| 7,483,904 B2 | 1/2009 | Owen et al. |
| 7,591,000 B2 | 9/2009 | Griffin et al. |
| 7,594,260 B2 | 9/2009 | Porras et al. |
| 7,640,574 B1 | 12/2009 | Kim et al. |
| 7,653,930 B2 | 1/2010 | Griffin et al. |
| 7,657,938 B2 | 2/2010 | Palmer, Jr. et al. |
| 7,673,323 B1 | 3/2010 | Moriconi |
| 7,676,834 B2 | 3/2010 | Camaisa et al. |
| 7,746,496 B2 | 6/2010 | Henry et al. |
| 7,765,298 B2 | 7/2010 | Villavicencio |
| 7,779,466 B2 | 8/2010 | Judge et al. |
| 7,793,290 B2 | 9/2010 | Gebhart et al. |
| 7,797,752 B1 | 9/2010 | Vaidya et al. |
| 7,810,147 B2 | 10/2010 | Duane et al. |
| 7,814,536 B2 | 10/2010 | Martherus et al. |
| 7,861,288 B2 | 12/2010 | Tsuruoka et al. |
| 7,861,289 B2 | 12/2010 | Meyer et al. |
| 7,861,290 B2 | 12/2010 | Meyer et al. |
| 7,865,943 B2 | 1/2011 | Hayler et al. |
| 7,886,352 B2 | 2/2011 | Pandrangi et al. |
| 7,890,655 B2 | 2/2011 | Chandrasekaran |
| 7,899,849 B2 | 3/2011 | Chaudhry et al. |
| 7,904,953 B2 | 3/2011 | Meyer et al. |
| 7,921,456 B2 | 4/2011 | Chua |
| 7,934,254 B2 | 4/2011 | Graham |
| 7,992,189 B2 | 8/2011 | Griffin et al. |
| 8,006,098 B2 | 8/2011 | Aupperle et al. |
| 8,010,991 B2 | 8/2011 | Sarukkai et al. |
| 8,020,206 B2 | 9/2011 | Hubbard et al. |
| 8,024,771 B2 | 9/2011 | Malkin et al. |
| 8,042,149 B2 | 10/2011 | Judge |
| 8,042,181 B2 | 10/2011 | Judge |
| 8,060,932 B2 | 11/2011 | Mohammed et al. |
| 8,079,070 B2 | 12/2011 | Camaisa et al. |
| 8,104,075 B2 | 1/2012 | Spector |
| 8,141,147 B2 | 3/2012 | Sinclair et al. |
| 8,160,975 B2 | 4/2012 | Tang et al. |
| 8,180,897 B2 | 5/2012 | Barrall et al. |
| 8,191,106 B2 | 5/2012 | Choyi et al. |
| 8,201,218 B2 | 6/2012 | Malakapalli et al. |
| 8,271,661 B2 | 9/2012 | Harris et al. |
| 8,272,060 B2 | 9/2012 | Milliken et al. |
| 8,296,178 B2 | 10/2012 | Hudis et al. |
| 8,302,189 B2 | 10/2012 | De Los Reyes et al. |
| 8,347,373 B2 | 1/2013 | Crawford |
| 8,356,074 B1 | 1/2013 | Ehrlich et al. |
| 8,364,812 B2 | 1/2013 | Loach |
| 8,397,283 B2 | 3/2013 | Hayler et al. |
| 8,402,530 B2 | 3/2013 | Anderson et al. |
| 8,429,708 B1 | 4/2013 | Tandon |
| 8,474,034 B2 | 6/2013 | Zhang et al. |
| 8,479,279 B2 | 7/2013 | Li et al. |
| 8,489,685 B2 | 7/2013 | Bharadhwaj et al. |
| 8,509,237 B2 | 8/2013 | Akella et al. |
| 8,539,544 B2 | 9/2013 | Garimella et al. |
| 8,549,617 B2 | 10/2013 | Wei et al. |
| 8,561,167 B2 | 10/2013 | Alperovitch et al. |
| 8,583,793 B2 | 11/2013 | De Icaza |
| 8,590,004 B2 | 11/2013 | Comay et al. |
| 8,595,791 B1 | 11/2013 | Chen et al. |
| 8,595,820 B1 | 11/2013 | Vaidya |
| 8,612,622 B2 | 12/2013 | Swanson et al. |
| 8,621,075 B2 | 12/2013 | Luna |
| 8,621,638 B2 | 12/2013 | Judge et al. |
| 8,627,467 B2 | 1/2014 | Levy et al. |
| 8,635,690 B2 | 1/2014 | Alperovitch et al. |
| 8,650,608 B2 | 2/2014 | Ono et al. |
| 8,661,505 B2 | 2/2014 | Kougiouris et al. |
| 8,677,453 B2 | 3/2014 | Chang et al. |
| 8,713,682 B2 | 4/2014 | Shulman et al. |
| 8,713,694 B2 | 4/2014 | Harada et al. |
| 8,719,447 B2 | 5/2014 | Gupta et al. |
| 8,819,663 B2 | 8/2014 | Goel et al. |
| 8,819,814 B1 | 8/2014 | Leach et al. |
| 8,843,153 B2 | 9/2014 | Luna et al. |

(56) References Cited

U.S. PATENT DOCUMENTS

| | | |
|---|---|---|
| 8,844,040 B2 | 9/2014 | Harris et al. |
| 8,849,899 B1 | 9/2014 | L'Heureux et al. |
| 8,849,902 B2 | 9/2014 | Fiatal |
| 8,850,598 B2 | 9/2014 | Pelley et al. |
| 8,869,234 B2 | 10/2014 | Radkowski et al. |
| 8,874,761 B2 | 10/2014 | Backholm |
| 8,893,215 B2 | 11/2014 | Burghart |
| 8,898,340 B2 | 11/2014 | Vange et al. |
| 8,903,918 B2 * | 12/2014 | Bharadhwaj ........... G06Q 10/10 709/205 |
| 8,910,255 B2 | 12/2014 | Nice et al. |
| 8,938,773 B2 | 1/2015 | Hubbard |
| 8,966,576 B2 | 2/2015 | Giambiagi et al. |
| 8,972,493 B2 | 3/2015 | Cobb et al. |
| 8,977,750 B2 | 3/2015 | Ferris |
| 8,978,140 B2 | 3/2015 | Hubbard et al. |
| 8,984,056 B2 | 3/2015 | Ehrlich et al. |
| 9,003,524 B2 | 4/2015 | Baddour et al. |
| 9,015,348 B2 | 4/2015 | Hofmann et al. |
| 9,021,021 B2 | 4/2015 | Backholm et al. |
| 9,021,573 B2 | 4/2015 | Natarajan et al. |
| 9,047,322 B2 | 6/2015 | Ou et al. |
| 9,075,788 B1 | 7/2015 | Roth et al. |
| 9,191,369 B2 * | 11/2015 | Bharadhwaj ........... G06Q 10/10 |
| 2001/0049793 A1 | 12/2001 | Sugimoto |
| 2002/0023145 A1 | 2/2002 | Orr et al. |
| 2002/0108059 A1 | 8/2002 | Canion et al. |
| 2002/0152373 A1 * | 10/2002 | Sun ................... H04L 63/0209 713/150 |
| 2003/0046576 A1 | 3/2003 | High et al. |
| 2003/0177390 A1 | 9/2003 | Radhakrishnan |
| 2004/0083305 A1 | 4/2004 | Wang et al. |
| 2004/0107360 A1 | 6/2004 | Herrmann et al. |
| 2004/0111643 A1 | 6/2004 | Farmer |
| 2004/0158705 A1 | 8/2004 | Burdett et al. |
| 2004/0236963 A1 | 11/2004 | Danford et al. |
| 2004/0268149 A1 | 12/2004 | Aaron |
| 2005/0021764 A1 | 1/2005 | Barrall et al. |
| 2005/0138412 A1 | 6/2005 | Griffin et al. |
| 2005/0182958 A1 | 8/2005 | Pham et al. |
| 2005/0229236 A1 | 10/2005 | Devgan et al. |
| 2005/0251851 A1 | 11/2005 | Patrick et al. |
| 2005/0251852 A1 | 11/2005 | Patrick et al. |
| 2005/0257245 A1 | 11/2005 | Patrick et al. |
| 2005/0273850 A1 | 12/2005 | Freund |
| 2006/0005237 A1 | 1/2006 | Kobata et al. |
| 2006/0048210 A1 | 3/2006 | Hildre et al. |
| 2006/0085850 A1 | 4/2006 | Mayfield et al. |
| 2006/0095953 A1 | 5/2006 | Frank |
| 2006/0212925 A1 | 9/2006 | Shull et al. |
| 2006/0236363 A1 | 10/2006 | Heard et al. |
| 2006/0253605 A1 | 11/2006 | Sundarrajan et al. |
| 2006/0277590 A1 | 12/2006 | Limont et al. |
| 2006/0294297 A1 | 12/2006 | Gupta |
| 2007/0002862 A1 | 1/2007 | Kanekar et al. |
| 2007/0118881 A1 | 5/2007 | Mitchell et al. |
| 2007/0150441 A1 | 6/2007 | Morris |
| 2007/0150934 A1 | 6/2007 | Fiszman et al. |
| 2007/0157287 A1 | 7/2007 | Lim |
| 2007/0169168 A1 | 7/2007 | Lim |
| 2007/0244987 A1 | 10/2007 | Pedersen et al. |
| 2007/0245409 A1 | 10/2007 | Harris et al. |
| 2008/0028445 A1 | 1/2008 | Dubuc et al. |
| 2008/0060051 A1 | 3/2008 | Lim |
| 2008/0071859 A1 | 3/2008 | Seed et al. |
| 2008/0184336 A1 | 7/2008 | Sarukkai et al. |
| 2009/0077086 A1 | 3/2009 | Malkin et al. |
| 2009/0083831 A1 | 3/2009 | Kanai |
| 2009/0164560 A1 | 6/2009 | Fiatal |
| 2009/0178107 A1 | 7/2009 | Karjoth et al. |
| 2009/0178108 A1 | 7/2009 | Hudis et al. |
| 2009/0178109 A1 | 7/2009 | Nice et al. |
| 2009/0178131 A1 | 7/2009 | Hudis et al. |
| 2009/0290508 A1 | 11/2009 | Puthenpura et al. |
| 2009/0292824 A1 | 11/2009 | Marashi et al. |
| 2009/0300600 A1 | 12/2009 | Sugai |
| 2009/0300707 A1 | 12/2009 | Garimella et al. |
| 2010/0023582 A1 | 1/2010 | Pedersen et al. |
| 2010/0057995 A1 | 3/2010 | Cao et al. |
| 2010/0100949 A1 | 4/2010 | Sonwane et al. |
| 2010/0325692 A1 | 12/2010 | Rissanen |
| 2011/0016180 A1 | 1/2011 | Bharadhwaj et al. |
| 2011/0043652 A1 | 2/2011 | King et al. |
| 2011/0047620 A1 | 2/2011 | Mahaffey et al. |
| 2011/0276446 A1 | 11/2011 | Gupta et al. |
| 2011/0296523 A1 | 12/2011 | Schechter et al. |
| 2012/0011271 A1 | 1/2012 | Zhao et al. |
| 2012/0030749 A1 | 2/2012 | Anderson et al. |
| 2012/0089700 A1 | 4/2012 | Safruti et al. |
| 2012/0185937 A1 | 7/2012 | Levy et al. |
| 2012/0290642 A1 | 11/2012 | Shaughnessy et al. |
| 2013/0055344 A1 | 2/2013 | Rissanen et al. |
| 2013/0103786 A1 | 4/2013 | Miglore |
| 2013/0145421 A1 | 6/2013 | Kougiouris et al. |
| 2013/0174215 A1 | 7/2013 | Mattsson |
| 2013/0219483 A1 | 8/2013 | Cho et al. |
| 2013/0297700 A1 | 11/2013 | Hayton et al. |
| 2013/0339940 A1 | 12/2013 | Goel et al. |
| 2014/0032759 A1 | 1/2014 | Barton et al. |
| 2014/0181889 A1 | 6/2014 | Black |
| 2014/0237543 A1 | 8/2014 | Cheeniyil et al. |
| 2015/0033288 A1 | 1/2015 | Lim |
| 2015/0046971 A1 | 2/2015 | Huh et al. |
| 2015/0058921 A1 | 2/2015 | Bharadhwaj et al. |

FOREIGN PATENT DOCUMENTS

| | | |
|---|---|---|
| WO | 2012056099 A1 | 5/2012 |
| WO | 2014079340 A1 | 5/2014 |

OTHER PUBLICATIONS

"A Web Service Architecture for Enforcing Access Control Policies", Science Direct, Electronic Notes in Theoretical Computer Science 142 (2006) 47-62 by Claudio Agostino Ardagna et al. (pp. 16).

* cited by examiner

| RATE (Mb/s) 502 | STRIP 504 (BYTES) | DIGEST BYTES 506 | SDE BYTES 508 | DIRE 510 (BYTES) | UTILIZATION (%) 512 | COMPRE-SSION 514 (TIMES) | STRIPS/S 516 (ON WIRE) | STRIPS/ WEEK 518 1 WK = 40 HRS, MB | INDEX 520 1 WK = 40 HRS, MB | HISTORY 522 1 WK = 40 HRS, GB | READS IOPS 524 | WRITES IOPS 526 |
|---|---|---|---|---|---|---|---|---|---|---|---|---|
| 1.5 | 1024 | 64 | 64 | 64 | 50% | 4 | 92 | 13 | 1609 | 13 | 366 | 92 |
| 10 | 1024 | 64 | 64 | 64 | 50% | 5 | 610 | 88 | 10729 | 84 | 3,052 | 610 |
| 100 | 1024 | 64 | 64 | 64 | 50% | 6 | 6,104 | 879 | 107288 | 838 | 36,621 | 6,104 |
| 1000 | 1024 | 64 | 64 | 64 | 50% | 7 | 61,035 | 8789 | 1072884 | 8382 | 427,246 | 61,035 |
| 10000 | 1024 | 64 | 64 | 64 | 50% | 8 | 610,352 | 87891 | 10728836 | 83819 | 4,882,813 | 610,352 |
| 1.5 | 512 | 64 | 64 | 64 | 50% | 4 | 183 | 26 | 3219 | 13 | 732 | 183 |
| 10 | 512 | 64 | 64 | 64 | 50% | 5 | 1,221 | 176 | 21458 | 84 | 6,104 | 1,221 |
| 100 | 512 | 64 | 64 | 64 | 50% | 6 | 12,207 | 1758 | 214577 | 838 | 73,242 | 12,207 |
| 1000 | 512 | 64 | 64 | 64 | 50% | 7 | 122,070 | 17578 | 2145767 | 8382 | 854,492 | 122,070 |
| 10000 | 512 | 64 | 64 | 64 | 50% | 8 | 1,220,703 | 175781 | 21457672 | 83819 | 9,765,625 | 1,220,703 |

FIGURE 5

| FUNCTIONS 901 | PROTOCOL INDEPENDENT ACCELERATION (ARR, TCP PROXY) 905 |
|---|---|
| | PROTOCOL DEPENDENT ACCELERATION (SINGLE & SPLIT PROTOCOL PROXIES) 909 |
| SERVICES 902 | NETWORK OF POPS 908 |
| | TRANSPORT 910 |
| | ELASTIC SCALABILITY 912 |
| | PAY PER USE 928 |
| | SELF SERVICE 929 |
| | NO HARDWARE MANAGEMENT 930 |
| MULTI-TENANCY 903 | SHARED POPs, NETWORK AND SOFTWARE 931 |
| | PERFORMANCE AND FAULT ISOLATION 932 |
| | QUALITY OF SERVICE BY TRAFFIC/CUSTOMER 933 |
| MULTI-SEGMENT 904 | POLICIES 914 |
| | LATENCY/SPEED: TCP WINDOW 916 |
| | COMPRESSION/DECOMPRESSION 918 |
| | SECURITY 920 |
| ROUTING 906 | HUB/HUB 922 |
| | HUB/SPOKE 924 |
| | SPOKE/SPOKE 926 |

APPLICATION ACCELERATION AS A SERVICE 950

APPLICATION ACCELERATION AS A SERVICE SYSTEM AND METHOD

CLAIM OF PRIORITY

This application is a continuation application of U.S. patent application Ser. No. 14/529,132 filed on Oct. 30, 2014. The application Ser. No. 14/529,132 is a continuation application of the U.S. non-provisional application Ser. No. 13/919,018 titled APPLICATION ACCELERATION AS A SERVICE SYSTEM AND METHOD filed on Jun. 17, 2013 which was issued on Dec. 2, 2014 assigned U.S. Pat. No. 8,903,918. The application Ser. No. 13/919,018 is a continuation application of U.S. patent application Ser. No. 12/550,409 filed Aug. 31, 2009, which was issued on Jul. 16, 2013 having U.S. Pat. No. 8,489,685, which claims priority under 35 USC §119(e) to U.S. Provisional Application No. 61/226,407 titled ENTERPRISE APPLICATION AND SECURE DATA ACCELERATION AS A SERVICE SYSTEM AND METHOD filed on Jul. 17, 2009, the entirety of each of which is herein incorporated by reference in its entirety.

FIELD OF TECHNOLOGY

This disclosure relates generally to a technical field of computer networking and, in one example embodiment, to a system and method of application acceleration as a service.

BACKGROUND

Content acceleration services may be limited to public applications and unsecure data in a public network. As a result, an organization may need to purchase, deploy, and/or maintain expensive infrastructure (e.g., compression appliances, decompression equipment, etc.) at each head office (e.g., the head office 102) and at each branch office (e.g., the branch offices 104A-N) to accelerate private applications and secure data.

For example, the organization may need to purchase expensive and proprietary hardware and/or software solutions that perform functions such as load balancing, compression, de-compression, and/or packet routing. In addition, the organization may need purchase expensive Multiprotocol Label Switching (MPLS) services from bandwidth providers. Such investments may be cost prohibitive for many organizations (e.g., small and medium size businesses). Furthermore, maintaining expensive hardware and software at each head office and each branch office can be complicated, unsightly, and unreliable.

SUMMARY

Disclosed are systems and methods to provide application acceleration as a service. A collaborative document is a document that is edited simultaneously by one or more people. A computed document is a document that is generated at run-time for one user. A static document is a document that is prepared a-priori. In one aspect, a system includes a head office to serve an enterprise application that includes a collaborative document. The system also includes a branch office to request the collaborative document from the head office. In addition, the system also includes a set of Point of Presence (POP) locations between the head office and the branch office to communicate the collaborative document on behalf of the head office from a closest POP location to the head office to a closest POP location to the branch office and then onward to the branch office.

The collaborative document may be accessed and/or simultaneously modified by a number of different users at the branch office on a frequent basis. The enterprise application may include a computed document and/or a static document. The set of POP locations between the head office and the branch office may communicate the computed document and/or the static document on behalf of the head office from the closest POP location to the head office to the closest POP location to the branch office and then onward to the branch office.

The enterprise application may be an internal application of a business entity. The head office of the business entity and the branch office of the business entity may securely access the enterprise application through a private network using one or more of public addresses of source and destination routers, pools of addresses represented by a firewall, using a Multiprotocol Label Switching (MPLS) label, and/or using a Virtual Local Area Network (VLAN) tag. The enterprise application may be optionally executed at any of the set of POP locations.

In addition, the system may include an optional Customer Premise Equipment (CPE) device, an optional branch router and an optional head-office router, coupled with the head office and/or the branch office may perform a protocol independent Advanced Redundancy Removal (ARR) function to avoid sending previously sent patterns in a transport stream and/or a packet stream. The system may include the optional CPE device, the optional branch router and the optional head-office router, coupled with the head office and/or the branch office may also generate a secure transport data sent over secure tunnels of the collaborative document, the computed document, and/or the static document. The system may also include the optional CPE device, the optional branch router and the optional head-office router, coupled with the head office and/or the branch office to communicate the secured transport data between a client device in the branch office and the head office, with optional intervening firewalls, through an Internet Protocol Security (IPsec) tunnel, a Generic Routing Encapsulation (GRE) tunnel, VLAN, and/or MPLS labels using IP headers. The CPE may also perform protocol dependent split proxies on the transport stream and/or the packet stream. In addition, the CPE may perform Transmission Control Protocol (TCP) proxies, with varying policies for any of a TCP windows, buffering and/or security.

The optional CPE device may resolve a first bandwidth limitation in a first link between the closest POP location to the branch office and the branch office and to reduce communication time of the collaborative document, the computed document, and the static document in the link between the closest POP location to the branch office and the branch office. In addition, the optional CPE device may resolve a second bandwidth limitation in a second link between the closest POP location to the head office and the head office and to reduce communication time of the collaborative document, the computed document, and the static document in the link between the closest POP location to the head office and the head office. The system of POPs and optional CPEs may perform protocol dependent proxy function (e.g., singly or split across POPs and optional CPEs) to resolve bandwidth limitation or communication time reduction by simplifying the protocol or anticipating requests on behalf of the branch office users. A combination of protocol dependent (e.g., implemented through single and split protocol proxies) and protocol independent functions (e.g., implemented through ARR, TCP proxy) to solve bandwidth reduction and/or communication time reduction may be defined as the application acceleration function. When the aforementioned functions are delivered as a service, the service is called application acceleration as a service.

In addition, the system may include an optional storage of the set of POP locations and the optional CPE device to reduce an amount of data flow when the ARR function is performed. The optional storage may be a flash device, a solid state device and/or a hard drive. In addition, the system may include a public server to generate a computed document and a static document. The branch office may request the computed document and the static document from the head office through the transport stream (e.g., TCP) and/or the packet stream (e.g., IP). The set of POP locations may route a transport stream and a packet stream on behalf of the public server from a closest POP location to the public server to the closest POP location to the branch office to the branch office. There may be one or more head offices, multiple ones of the public server, and multiple ones of the branch office. The head office and/or the branch office may communicate with each other through a private network and/or a public network. The public server and/or the branch office may communicate with each other through the public network and/or the private network.

The computed document may be generated based on a recent interaction between the public server and the branch office during a secure session of the public network. The set of POP locations may be shared by one or more of licensed entities of an application acceleration service. The licensed entities may have one or more head offices and one or more branch offices. Each of the licensed entities may leverage both a shared software and/or a shared hardware infrastructure of an application acceleration service provider. An alternate path may be used to route a transport stream and/or a packet stream that includes the collaborative document, the computed document, and/or the static document between the head office and the branch office when routing through the closest POP location to the branch office is undesirable due to a network congestion, a service unavailability, and/or a segment policy.

An external service may be accessed by the branch office without communicating through the head office when a request to access the external service is communicated from the branch office directly to a particular POP location closest to the external service. A compression between each of the set of POP locations may be variable based on a path segment policy between each of the set of POP locations, the CPE, and/or the head office.

In another aspect, a system includes a business entity that has one or more head offices and one or more branch offices. A set of Point of Presence (POP) locations that are geographically proximate to the one or more head offices and the one or more branch offices may perform an application acceleration function for business entities through a placement of a collaborative document, a computed document, and/or a static document of an enterprise application at a closest POP location to a requesting entity. An optional Customer Premise Equipment (CPE) device at either of the head office and the requesting entity to perform an Advanced Redundancy Removal (ARR) function on the collaborative document, the enterprise application, and/or the computed document. In addition, the CPE may perform TCP proxies with varying policies for TCP windows, buffering and/or security. The CPE may optionally perform protocol dependent split proxies on a transport stream and/or a packet stream.

The requesting entity may be one or more of the branch office of the business entity, a secondary head office to a particular head office of the business entity in which the collaborative document, the computed document, and/or the static document is hosted, and a consumer client-side device. The application acceleration function may be offered as a service to the business entity. A public server may generate the computed document and the static document. A Content Delivery Network (CDN) may optionally host the static document. The requesting entity may request the computed document and/or the static document from the head office through the transport stream and the packet stream. The set of POP locations may route the transport stream and/or the packet stream on behalf of the public server and/or the CDN from the closest POP location to the requesting entity to the requesting entity.

In yet another aspect, a method includes serving an enterprise application comprised of a collaborative document from a head office of a business entity to a branch office. The method also includes processing a request from the branch office for the collaborative document using a processor. In addition, the method includes communicating the collaborative document through a transport stream and/or a packet stream on behalf of the head office from a closest Point of Presence (POP) location to the head office to a closest POP location to the branch office and then onward to the branch office.

The communication of the collaborative document through a transport stream and/or a packet stream on behalf of the head office from a closest Point of Presence (POP) location to the head office to a closest POP location to the branch office and then onward to the branch office may eliminate a requirement to purchase and maintain expensive hardware and software devices at the head office and the branch office to compress and decompress data, and may eliminate a need for the head office to subscribe to a Multiprotocol Label Switching (MPLS) network. The method also includes accelerating the collaborative document from the head office to the branch office.

In addition, the method may include routing the transport stream and the packet stream comprising of the collaborative document, computed document and/or the static document through an alternate path between the head office and the branch office when routing through the closest POP location to the branch office is undesirable due to a network congestion, a service unavailability, and/or a segment policy.

In an other aspect, a method includes providing an application acceleration service to a business entity having one or more head offices and one or more branch offices. The method includes placing a set of Point of Presence (POP) locations in a geographically proximate manner to the head office and the branch office. The method also includes performing an application acceleration function for business entities through a placement of at a collaborative document, a computed document, and/or a static document at a closest POP location to a requesting entity using a processor. In addition, the method includes performing an Advanced Redundancy Removal (ARR) function on the collaborative document, the computed document, and/or the static document using the processor. The ARR function may optionally perform protocol dependent split proxies on a transport stream and/or a packet stream. The method also includes performing TCP proxies with varying policies for one or more of TCP windows, buffering and security.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE VIEWS OF DRAWINGS

Example embodiments are illustrated by way of example and not limitation in the figures of accompanying drawings, in which like references indicate similar elements and in which:

FIG. 5 is a table view illustrating an Advanced Redundancy Removal (ARR) resource consumption as a function of rate of compression, according to one or more embodiments.

FIG. 9 illustrates a core services provided by application acceleration as a service, according to one or more embodiments.

Other features of the present embodiments will be apparent from accompanying Drawings and from the Detailed Description that follows.

DETAILED DESCRIPTION

Example embodiments, as described below, may be used to provide application acceleration as a service. It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments.

Figure 1:
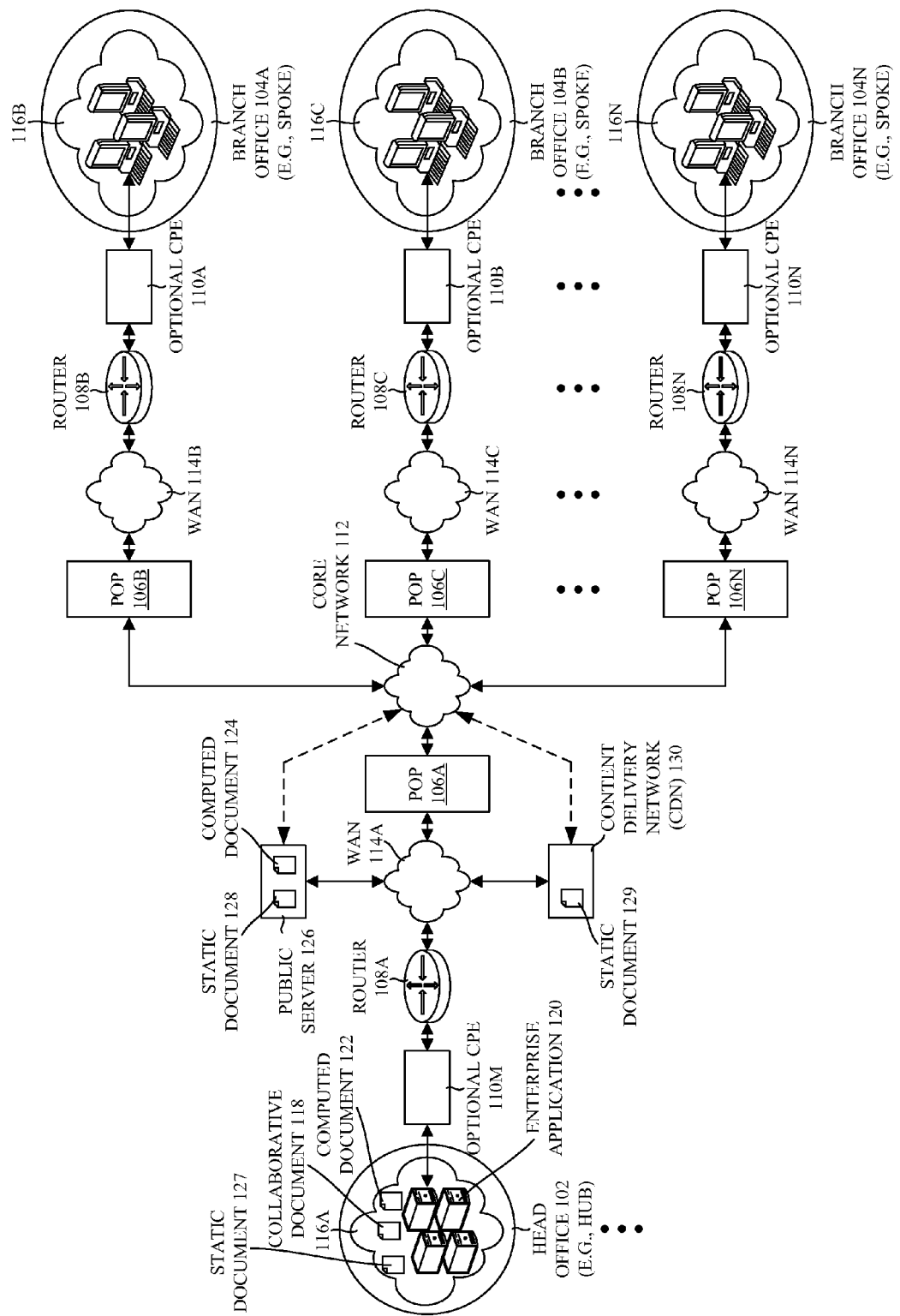
FIG. 1 is a system view illustrating implementation of application acceleration as a service, according to one embodiment.

FIG. 1 is a system view illustrating implementation of application acceleration as a service, according to one embodiment. In particular, a system in FIG. 1 illustrates a head office 102, a branch office 104A-N, Points Of Presence (POP) locations 106A-N, a router 108A-N, a Customer Premise Equipment (CPE) 110A-N, a core network 112, a WAN 114A-B, a LAN 116A-B, a collaborative document 118, an enterprise application 120, a computed document 122-124, a public server 126, static document 127-129, and Content Delivery Network (CDN) 130, according to one embodiment. It will be appreciated that while one head office 102 is illustrated, the various embodiments disclosed herein can apply in scenarios in which there are multiple head offices and/or multiple branch offices.

Each of the POP locations 106A-N may be access points to the Internet. For example, each of the POP location 106A-N may be physical locations that house servers, routers, ATM switches and digital/analog call aggregators. Each POP location 106A-N may be either part of the facilities of a telecommunications provider that the Internet service provider (ISP) rents and/or a location separate from the telecommunications provider. ISPs may have multiple POP locations, sometimes numbering in the thousands. The POPs 106A-N may also be located at Internet exchange points and co-location centers.

A business entity may include the head office 102 (or more head offices) and multiple branch offices 104A-N. The branch offices 104A-N may be spread across different geographies (e.g., regions, countries). The head office 102 and the branch offices 104A-N may be communicatively coupled through the WAN 114A-N. The WAN 114A-N between the head office 102 and the branch offices 104A-N may be enabled through a variety of networking protocols (e.g., Ethernet, Fractional T1/E1, T1/E1, Digital Signal 3 (DS3), Integrated Services Digital Network (ISDN), broadband (e.g., Digital Subscriber Line (DSL), cable, etc.), satellite). In one or more embodiments, the WAN 114A-N may be leased lines or Internet (e.g., egress/ingress only). In one embodiment, the head office 102 (or more head offices), the branch offices 104A-N, the public server 126 may communicate with each other through a private network, and/or the public network. The core network 112 may include the private network and the public network. In one or more embodiments, the core network 112 may use WAN 114A-N/Internet to communicate with the POPs 106A-N, the external services (e.g., such as the service providers 306-308 of FIG. 3), the public server 126 and the CDN 130.

The head office 102 may serve the enterprise application 120, comprised of the collaborative document 118. The enterprise application 120 may be an internal application of the business entity (e.g., that includes one or more head offices 102 and one or more associated branch offices 104A-N). The head office 102 and the branch offices 104A-N may securely share (e.g., access, modify, etc.) the enterprise applications 120 (e.g., Enterprise Resource Planning (ERP), Customer Relationship Management (CRM), e-mail and ftp, voice and video, remote file systems, centralized backup, etc.) over the WAN 114A-N, through a private network using any of public addresses of source and destination routers, pools of addresses represented by a firewall, using a Multiprotocol Label Switching (MPLS) label, and using a Virtual Local Area Network (VLAN) tag. The collaborative document 118 (e.g. Microsoft® Word documents, Microsoft® Excel documents) may be documents that are accessed and simultaneously modified by a number of different users at the branch office 104A-N on a frequent basis through the core network 112 (e.g., through the private network in the core network 112). For example, a collaborative document may be a large structured (e.g. spreadsheet) file and/or an unstructured (e.g. word processing) file simultaneously and frequently accessed and modified by users across head office and branch offices of the same organization (e.g., same business, institution, etc.). In one embodiment, the branch office 104A-N (e.g., also known as requesting entity) may request for the collaborative documents 118, the computed document 122-124 and/or the static document 127-129 service from the head office 102. The branch office 104A-N may include several computing devices that access/modify the collaborative documents 118 in the computing devices managed by processors.

The requesting entities will be described. Particularly, requesting entities (e.g., devices at branch offices 104A-N) may be desktops and/or laptops running client applications like Windows Explorer, Microsoft® Word®, Internet Explorer®, etc. and open client connections to servers at head offices such as the head office 102. Data communication (e.g., such as the communication of the collaborative document, the static document and/or the computed document) between the head office 102 and the branch offices 104A-N may be accelerated using application acceleration services disclosed herein, according to one embodiment. In one or more embodiments, the POPs 106A-N and the optional CPEs 106A-N may perform protocol dependent proxy function (e.g., singly or split across POPs and optional CPEs) to resolve bandwidth limitation or communication time reduction by simplifying the protocol or anticipating requests on behalf of the branch office users. A combination of protocol dependent and protocol independent functions to solve bandwidth reduction and/or communication time reduction may be defined as the application acceleration function. When the aforementioned functions are delivered as a service, the service may be called application acceleration as a service The serving entities will be described. Particularly, serving entities (e.g., the head office 102) may include servers that host and run the enterprise applications over the WAN 114A-N. The servers may include the file servers, the mail servers, the web servers, public servers, etc. The head office 102 may also include other devices like storage devices, networking devices, etc. The servers and other devices in the head office 102 may be communicatively coupled with other servers and devices in the head office 102 through the LAN 116A. The enterprise application 120 may communicate the collaborative document 118, the computed documents 112-124, and other the static documents 127-129 to the branch offices 104A-N through a transport stream (e.g., TCP) and/or a packet stream (e.g., IP). The transport stream and/or the packet stream may be routed through the POP locations 106A-N. Furthermore, the transport stream and/or the packet stream may be routed in the secure tunnels to destinations via the POPS 106A-N. In one or more embodiments, the public server 126 may generate and host the computed document 124 and/or the static document. The computed document 124 (e.g. HTML and XML) may be generated based on a recent interaction between the public server 126 and the branch office during a secure session (e.g., HTTPS) of the public network 130. In addition, the computed document 124 may be the document that may be generated based on response to a public page (e.g., response page). In one or more embodiments, the computed document 124 may be custom created for a particular user. For example, a computed document may be a confirmation page of a commerce website that is custom created for a user immediately after a recent purchase during a secure session. In one or more embodiments, the CDN 130 may be used to optionally host the static documents to reduce the amount of data communicated between the head office 102 and the branch offices 104A-N. The CDN 130 may be a system of computers networked together across the core network 112 that may cooperate transparently to distribute content for the purposes of improving performance and scalability. The CDN 130 may not host the computed document 124 as hosting becomes inefficient.

In one embodiment, the computed documents 122 may also be generated in the head office 102 and hosted by the public server 126. The static document 127 may be a copy of a content data that may be frequently accessed by the branch offices 104A-N. For example, the static document 127 may be a web page that does not change very often such as a content data of the webpage, landing page of a website etc. provided by the head office to all the branch offices 104A-N. In an alternate embodiment, the enterprise application 120 may be executed directly from any of the POP locations 106A-N rather than from the head office 102.

Similarly, devices at the branch offices 104A-N may be communicatively coupled with other devices in the branch offices 104A-N through the internal local network 116B-N respectively. The router 108A-B may be a networking device that performs a task of routing and forwarding information to destinations. The router 108A-N may communicate data and/or information between the WAN 114A-N and the LAN 116A-N of the head office 102/the branch office 104A-N. The POP 106A-N may be a pool of servers providing WAN optimization and application acceleration. The POPs 106A-N may be communicatively coupled to each other directly or indirectly through the core network 112. Both the core network 112 and WAN 114A-N, may use leased lines and/or Internet. The core network 112 that carries the transport streams and the packet streams may also be compressed.

The private network (e.g., of the core network 112) may be a network that uses private Internet Protocol (IP) addresses based on specified standard (e.g., RFC 1918, RFC 4193, etc.). The POP locations 106A-N may route the transport streams and/or the packet streams that includes the collaborative document 118, and/or the computed document 122-124 on behalf of the head office 102 from a closest POP location to the head office 102 (e.g., the POP 106A as illustrated) to a closest POP location 106B-N to the branch office 104A-N and then onward to the branch office 104A-N. Furthermore, the POP 106A may route the static document 127 on behalf of the public server 126 to the branch office 104A-N through the transport stream and/or packet stream. The private network may use Network Address Translation (NAT) gateway, or a proxy server for connecting to the public network in the core network 112.

The optional CPE 110A-N (e.g., Aryaka™ CPE) may be a device installed at the branch office 104 and/or the head office 102 for performing WAN Advanced Redundancy Removal™ (ARR). It should be noted that Aryaka™ and Advanced Redundancy Removal™ are pending U.S. federal trademarks of Aryaka, Inc. and all rights are reserved to these names.

The optional CPE 110A-N may be configured to perform secure transport of data and communicate the secured data (e.g., collaborative document 118 and the enterprise application 120) between client devices in the branch office 104A-N and the head office(s) 102, with optional intervening firewalls, through Internet Protocol Security (IPsec)

tunnel, a Generic Routing Encapsulation (GRE) tunnel, VLANs, and MPLS labels using IP headers. In addition to the optional CPE, an optional branch router, and an optional head-office router (not shown in figure) may be user to perform the ARR, generation of secure transport data and communication of secure transport data over secure channels. Use of the optional CPE 110A-N may enable resolving bandwidth limitation in first/last mile.

The first mile may be a link between the closest POP location 106B-N to the branch office 104B-N and the branch office 104B-N. The last mile (e.g., also referred as second mile) may be a link between the closest POP location 106A to the head office 102 and the head office 102. The optional CPE 110A-N may reduce communication time of the collaborative document 118, the computed document 122-124, and/or the static document 127 in the link between the closest POP location 106B-N to the branch office 104B-N and the branch office 104B-N by resolving bandwidth limitation in the first mile. The optional CPE 110A-N may reduce communication time of the collaborative document 118 and the enterprise application 120 in the link between the closest POP location 106A to the head office 102 and the head office 102 by resolving bandwidth limitation in the last mile.

The use of the optional CPE 110A-N may enable faster data communication in the branch office 104A-N or the head office 102 if the communication line has a low bandwidth. However, if the branch office 104A-N and/or the head office 102 have sufficient bandwidth for data communication, the use of the optional CPE 110A-N may not be required. The POP 106A-N and the optional CPE 110A-N may have storage capabilities for performing Advanced Redundancy Removal for communicating data. The storage in the optional CPE 110A-N may be used for Advanced Redundancy Removal of data to reduce the amount of data flow. The storage in the optional CPE 110A-N may be a flash memory device, according to one embodiment. In alternate embodiments, the optional CPE 110A-N may be coupled or have internally within other types of non-volatile storage devices that includes hard drives, flash drives, solid state devices, etc. Protocol proxies (CIFS, MAPI, HTTP/HTTPS, FTP, PRINT, RTMP, RTP, Oracle, etc.) may be implemented within the POP 106A-N and/or the CPE 110A-N.

Usage of the POP 206A-B may eliminate the requirement of having intelligent synchronized WAN optimization equipments for solving latency and bandwidth at the head office 102 and the branch office 104 ends, according to one embodiment. In addition, the use of the Multiprotocol Label Switching (MPLS) may be eliminated at the core network 112 as the POPs 106A-B speeds up the data communication with no loss in packets and/or delay, according to one embodiment. According to one embodiment, the modified architecture may now be spread across the network with control over data from end to end. As a result, applications such as basic office documents (e.g., spreadsheets, word processing files, etc.), web applications (e.g., detail locators, catalogs, store locators, etc.), Internet applications, etc. may be accelerated through the acceleration as service, according to one embodiment. Large enterprise applications may also be accelerated using the POPs 106A-N. Acceleration of data may be possible as the POPs 106A-N are intelligently designed to analyze the destination of the data packet and to communicate the data packet to the destination without compromising and/or modifying client's private networks.

Figure 2:
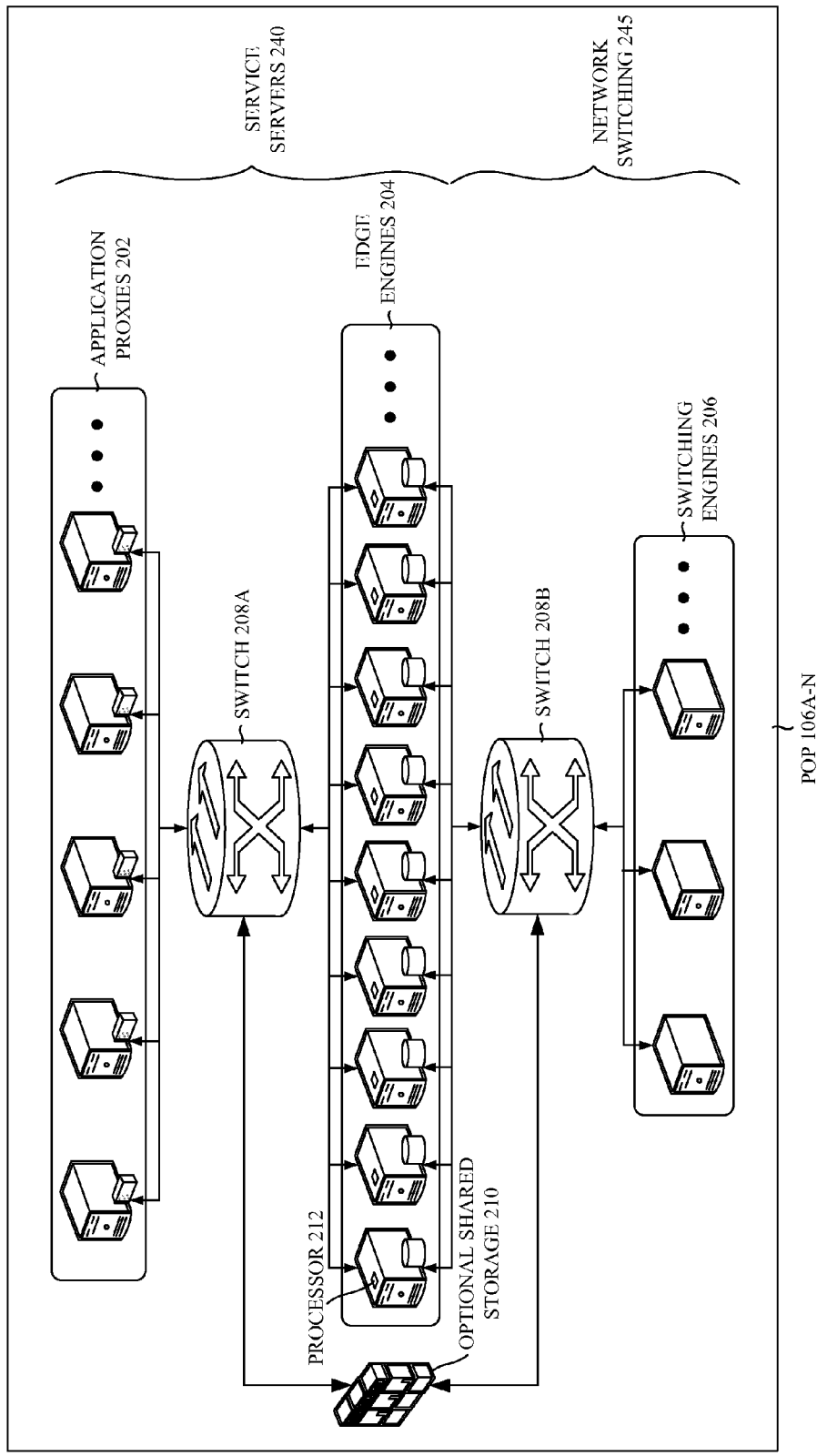
FIG. 2 is an exploded view of a POP device illustrated in of FIG. 1, according to one embodiment.

FIG. 2 is an exploded view of any of the POP 106A-N illustrated in of FIG. 1, according to one embodiment. In particular, FIG. 2 illustrates application proxies 202, edge engines 204, switching engines 206, switches 208A-B an optional storage device 210, a processor 212 of the edge engine 204, service servers 240, and network switching 245, according to one embodiment. Resource allocation for each engine at the POP 106A-N may be per customer-branch. However, every engine in the POP 106A-N may be scalable with load balancers. Also, the engines in the POP 106A-N may enable sharing of resources among different customers enabling multi-tenancy (e.g., multiple customers accessing the same hardware and software resources in each POP).

Figure 6:
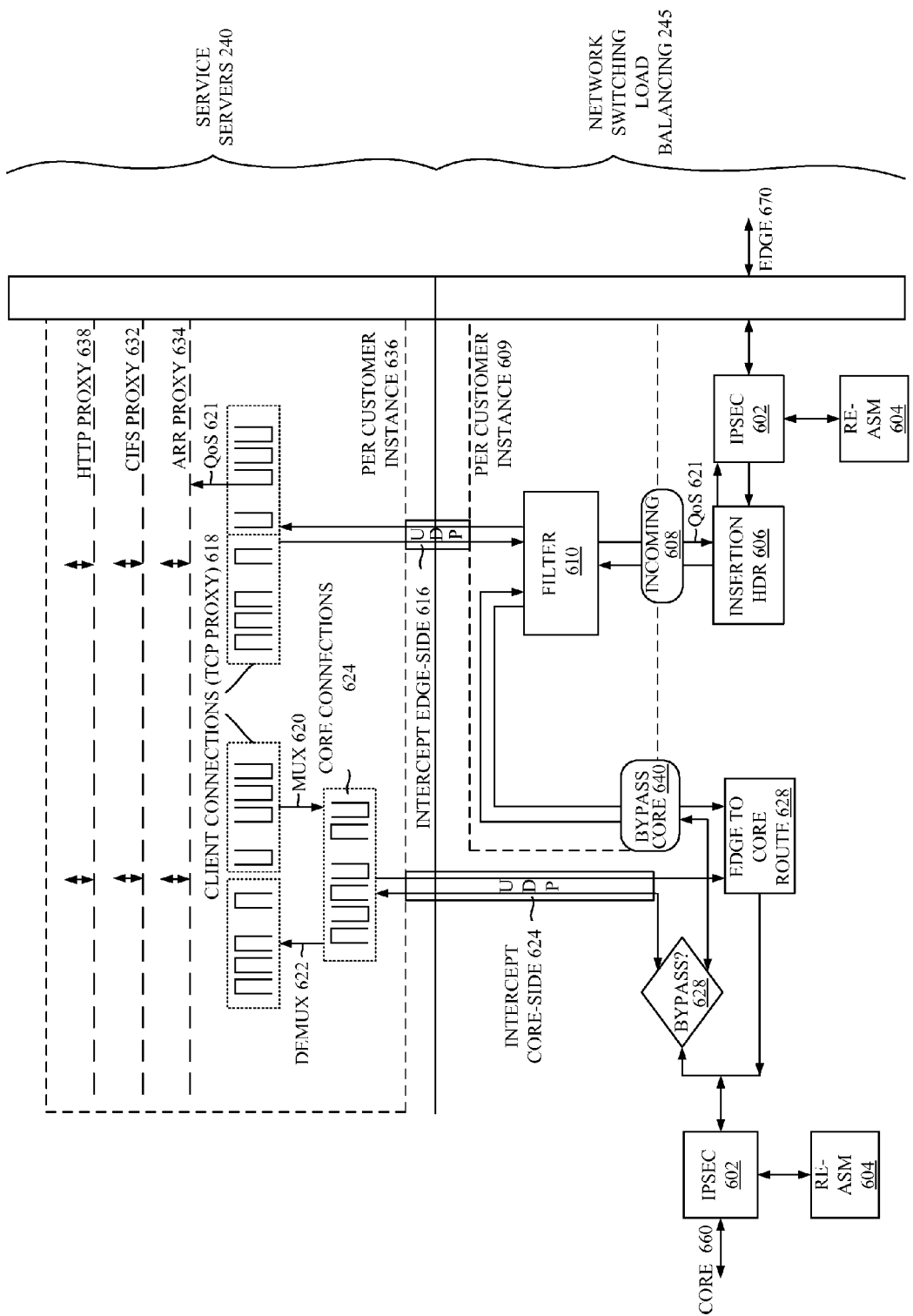
FIG. 6 is an architectural view illustrating one embodiment in which a service server and a network switching processes of any of the POP device may be performed, according to one embodiment.

The POP 106A-N may have within it, a pool of servers providing application acceleration. The POP 106A-N may include the application proxies 202, the edge engines 204, the switching engines 206 and the switches 208A-B. The application proxy 202 may implement and extend a number of protocols such as CIFS, HTTP, MAPI, SMTP, etc. The edge engines 204 may perform WAN data Advanced Redundancy Removal, transparent object caching, IPSEC/SSL security, POP stream shaping, POP-POP data encoding, etc. The switching engines 206 may perform POP-POP routing, QoS, packet classification, stream shaping and load balancing. The switches 208A-B may enable communication between the application proxies 202, the edge engines 204 and the switching engines 206. The application proxies 202, the edge engines 204 and the switch 208A may function as the service server 240. In one or more embodiments, the function as the service server 240 may run on one machine, or one process shared across customers or unique per customer. The service servers 240 may provide the QoS as packets are delivered based on priority order using the application proxies 202 and edge engines 204 based on the type of the data, application of the data, secure data, etc. The switch 208B and the switching engines 206 may manage the network switching 245. The network switching 245 may be function performed by the switching engine 206 to forward the data packets through the network. FIG. 6 and the paragraphs discussing FIG. 6 explain one architectural embodiment of this structure.

The POP 106A-N may also have the optional storage device 210 for performing ARR for transportation of data. In one or more embodiments, the storage 210 may be a shared storage. The ARR may be a class of techniques used to remove duplicate information between senders and receivers by capturing histories of data streams and holding these histories beyond the life of connections. The POPs 106A-N may be shared among different clients and different branches. In addition, the engines in the POP 106A-N may be shared by different clients. The POPs 106A-N may be centrally controlled through a control station. Also, the POPs 106A-N may provide a capability of being controlled from distributed locations.

Figure 3:
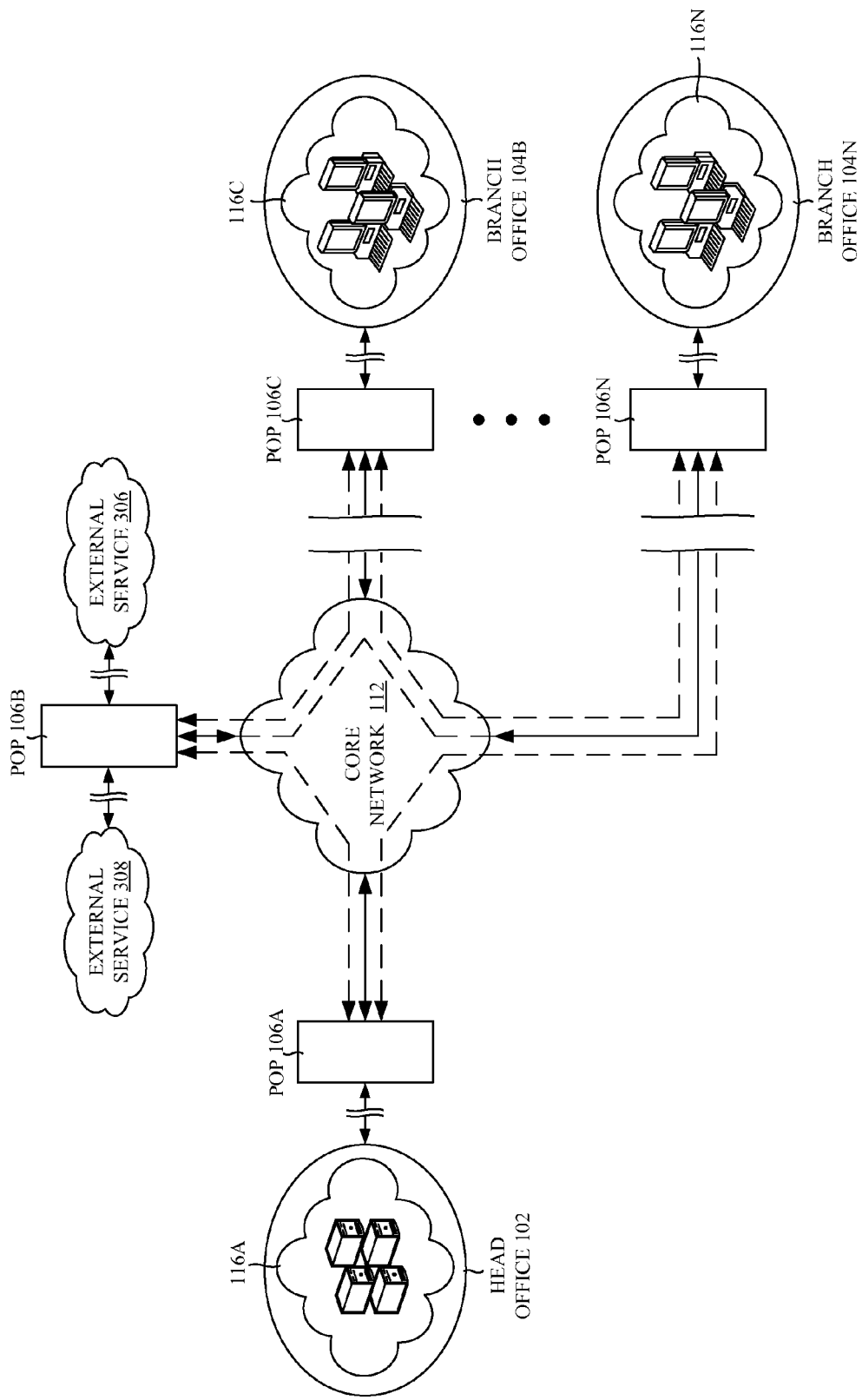
FIG. 3 is a system view illustrating multi segment pop-pop architecture, according to one embodiment.

FIG. 3 is a system view illustrating multi segment pop-pop architecture, according to one embodiment. The POPs 106A-N may be installed in various geographical locations (e.g., around the country, around the world, etc.). The POPs 106A-N may be communicatively coupled to each other directly or indirectly through a public network or a private network. In particular, the POPs 106A-N may be installed "close" to the location of the customer premises. For example, there may be a head office in San Francisco and branch offices in London and Geneva. The POPs may be installed in San Francisco, London, and Geneva. If the Geneva office requires transmission of large data to the London office, then the Geneva office may directly communicate the data to the London office without even going through the head office in San Francisco. The POP of the Geneva may intelligently identify the end destination as London, thereby communicating the data directly to the London POP. The POP locations closest to the branch offices or head office(s) may be determined before traffic is sent (e.g., pre-provisioned) or when traffic is sent (e.g., dynamic). The intermediate POPs (106B) can also be determined via pre-provisioned or dynamic techniques. However, it should be noted that the system may enable the business entity to communicate the data through the head office also.

The POP 106A-N may form a part of a core region (e.g., core region 660 as illustrated in FIG. 6). The core region 660 may be a cloud or interconnection of networks through which the communication occurs. In an example embodiment, the client edge region may be a location within physical premises of either the head office 102 and/or the physical premises of the branch offices 104 (e.g., edge region 670 as illustrated in FIG. 6).

In an embodiment, a segment may be a communication link between the POP and other POPs. For example, the segment may be an Internet or private point-point leased line. Policies may be assigned per segment. The POPs 106A-N may be communicatively coupled to each other through transport network. Since, the POPs 106A-N are communicatively coupled to each other directly/indirectly, there may be multiple segments. Therefore, the architecture in the system may be called as multi-segment architecture. Also, communication link between each of nodes may also be called as segment. The multi-segment architecture may be based on layer 3 (network layer)/layer 4 (transport layer). Subsequently, this disclosure calls the layer-3 segmentation bypass mode packets and layer-4 segmentation intercept mode packets (using TCP proxies). The multi-segmented architecture may enable each segment to have different queuing and routing policies based on cost and congestion.

In addition, the system as described in the disclosure may include Transmission Control Protocol (TCP) proxies (e.g., at layer 4) at each segment. ACKs of TCP proxies are acknowledged by immediately following segment which may significantly reduce congestion issues and packet loss. Each segment may be configured with different TCP policies (e.g., windows scaling, Selective ACKs (SACK), Additive Increase/Multiplicative Decrease (AIMD), etc) based on speed of link, congestion, peering points and customer preference. In addition, the TCP policies may be controlled per protocol, per client. Furthermore, the TCP policies may be changed at runtime based on traffic conditions at each segment.

In one embodiment, the segments may be formed through an Internet or private point-point leased lines, pre-provisioned, etc. The POP-POP multi-segmented architecture may be lossless. The lossless ability may be achieved using a combination of layer 4 and a proprietary buffer reservation system (e.g., storage at the POPs 106A-N and optional CPE 110A-N). Furthermore, each segment may implement link utilization algorithms (e.g., interleaving algorithm, piggybacking algorithm, connection multiplexing algorithm) using transport protocols (layer 4) like standard TCP, High Speed TCP, Explicit Control Protocol (XCP) and/or even Stream Control Transmission Protocol (SCTP).

FIG. 3 also can be seen as a system view illustrating application acceleration as a service, according to an example embodiment. In particular, FIG. 3 illustrates the head office 102, the branch office 104A-N, the POP 106A-N, an external service 306, and an external service 308, according to an example embodiment. The POP 106A-N may be installed to a "closest" location of the clients 306-308, the head office 102 and the branch office 104A-N. The POPs 106A-N may be communicatively coupled to each other. In an embodiment, due to the presence of the multiple POPs 106A-N, traffic may be intelligently diverted to the destination POP. The route between POPs 106A-N may be determined before sending traffic (e.g., pre-provisioned) or determined after sending traffic (e.g., dynamic). The segment formed may have the application acceleration capabilities for communicating data without unwanted delay or packet loss. As a result, there may be significant improvement in bandwidth savings and lower latency.

For example, the branch office 104B may require communication with the external services 306 (e.g., SAAS applications like Salesforce.com® and/or Web filtering like Websense®). Instead of sending the traffic to the POP 106A of the head office 102 for services, the POP 106C can direct the traffic to the POP 106B of the external services 306 directly. As a result, the time for the data communication of data may significantly reduce. In another embodiment, when the head office 102, wants to communicate with external services 306 (e.g. Amazon web services). The communication may be channeled directly to the external services 306 by the POP 106A-N instead of directing through the Internet. Utilizing the POPs 106 A-N instead of directing through the Internet would substantially improve latency and reduce bandwidth costs.

In an embodiment, the system may provide high availability (e.g., connectivity end to end). In an event of the POP failure (e.g., due to a network congestion, a service unavailability, a segment policy, etc.), the system may switch the coupling to a different POP. In case, when there is an intermediate POP failure, an alternate route may be determined and the data is re-routed. Data re-routing may be well understood even in a label switched network. However, in a multi-segmented network with encryption and compression, the final destination may not be known unless the payload is inspected (and the payload is encrypted and compressed). The system may provide an out-of-band protocol that may communicate the final destination address used for controlling the re-routing of the compressed/encrypted payload in the event of POP failure. In an example embodiment, the head office 102 in FIG. 3 may require communication with the external service 306. If the communication between the POP 106A and the POP 106B fails, then the communication of the head office 102 may be routed via the POP 106C. In the event of communication failure between the POP 106A and the POP 106C, the communication may be established between the head office 102 by routing through the POP 106N to the POP 106C.

In another embodiment, the set of POP locations 106A-N may be shared by more than one licensed entity of the application acceleration service. For example, the external service providers 306-308 may not be a part of the business entity. However, the service providers 306-308 may be clients of the business entity or the service providers to the business entity. The service providers 306-308 discussed herein may also be the licensed entities of the application acceleration service. Therefore, the service providers 306-308 may be entitled to use the POP locations 106A-N closest to them. As a result, the licensed entities may leverage both a shared software and a shared hardware infrastructure of an application acceleration service provider. It may be noted that the licensed entities may also have head offices and branch offices. The embodiments described herein may not be limited to hub-spoke configurations (e.g., the head office 102 serving as a hub and the branch offices 104A-N configured as a spokes). It should be noted that the embodiments described herein may also support hub-hub (e.g., the head office 102 requesting for services from an external service provider) and spoke-spoke configurations (e.g., services among the branch offices 104A-N).

Figure 4:
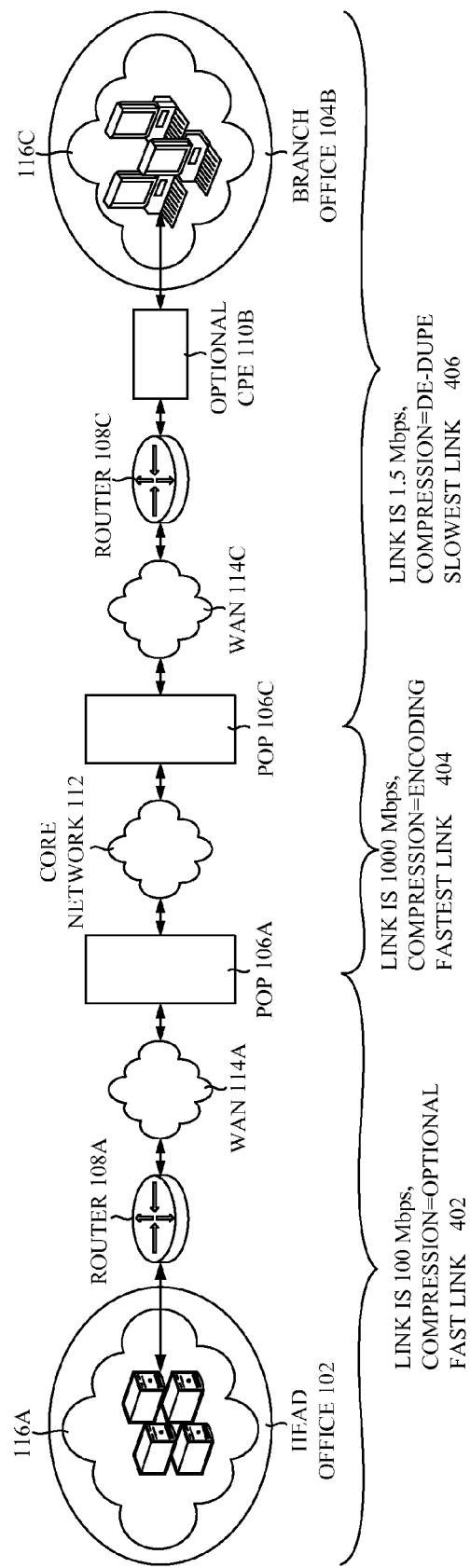
FIG. 4 is a system view illustrating implementation of variable compression per segment in the multi-segmented architecture, according to an example embodiment.

FIG. 4 is a system view illustrating implementation of variable compression per segment in the multi-segmented architecture, according to an example embodiment. The multi-segmented architecture supports variable compression per segment. The choice of compression may be based on the bandwidth speeds at each segment, insertion model complexities and customer preference. An insertion model may be a mechanism chosen by the customer to connect to POP 106A-N and provide sufficient information to route packets in a network. The ARR techniques may be implemented for slowest segment. Encoding operations (e.g., adaptive Huffman coding, LZH, GZIP, PAQ etc) with various complexities may be implemented at the faster segments. In an example embodiment, the segment between the head office 102 and the POP 106A may support a bandwidth of 100 Mbps 402. The compression model that can be implemented for the 100 Mbps segment 402 may be an optional insertion model.

The Advanced Redundancy Removal for the head office 102—the POP 106A segment may be only optional. The segment between the POP 106A and the POP 106C through a private network may have a bandwidth of 1000 Mbps 404. The compression technique that can be implemented for the segment between the POP 106A and the POP 106C with bandwidth of 1000 Mbps 404 may include adaptive Huffman coding, LZH, GZIP, PAQ, etc. Furthermore, the link between the POP 106C and the branch office 104B may have a bandwidth of 1.5 Mbps 406, and the compression model that can be implemented may be a WAN Advanced Redundancy Removal model. The Advanced Redundancy Removal resource consumption as a function of rate of compression is illustrated in FIG. 5.

Particularly, the table in FIG. 5 illustrates, a rate 502, strip 504, digest bytes 506, SDE bytes 508, DIRE bytes 510, utilization percentage 512, compression number 514, stripes/s on wire 516, stripes/week 518, index 520, history 522, reads IOPs 524, and writes IOPs 526. Most notably, FIG. 5 illustrates that as the rate 502 increases, the number of stripe/s on wire 516 increases dramatically. As such, more processing power and processing capability is required to implement compression at higher rates 502.

FIG. 6 is an architectural view illustrating one embodiment in which the service server 240 and the network switching 245 processes of any of the POP 106A-N may be performed, according to one embodiment. Particularly, FIG. 6 illustrates Internet Protocol Security (IPsec) 602, an IP Re-Assembly 604, an Insertion Model Header analyzer 606, an Incoming Redirector 608 which sends packets from 606 to Per Customer instances 609 of Filter 610, an edge UDP for intercept path 616, sent to Per customer instances 636 of client connections created from TCP Proxies 618, a mux 620 (multiplexer), a QoS 621, a demux 622 (demultiplexer), into core network connections 624, a bypass traffic determiner 628, per customer instance of Common Internet File System (CIFS) proxy 632, per customer instance of Application Redundancy Removal 634, per customer instance 636, and per customer (or, global) Hyper Text Transfer Protocol proxy (HTTP) proxy 638, according to one embodiment.

The IPsec 602 may be a protocol suite for securing Internet Protocol (IP) communications by authenticating and/or encrypting each IP packet of a data stream. The IPsec 602 may be used to protect data flows between a pair of hosts (e.g. computer users or servers), between a pair of security gateways (e.g. routers or firewalls), and/or between a security gateway and a host.

The Insertion Header analyzer 606 may be components that read per customer packet headers (e.g., encapsulated in IPSEC over Generic Routing Encapsulation GRE) and determine the instances to redirect. The Incoming Redirector 608 may perform the actual work of redirecting the traffic to per Customer instances 609. One per Customer instance may be the Filter 610 that tracks L3 and L4 state and determines if the traffic needs to be bypassed or intercepted. Bypassed traffic may be directed to the core network via per Customer instance Core Bypasser 640. Intercepted traffic may be sent to Service Servers (e.g., the service servers 240 as illustrated in FIG. 2) using Intercept Edge-Side UDP connections 616 to Per customer instances of Proxies 636. In this embodiment, servers 245 and 240 may hold multiple customer instances of both the Filter and the proxies (e.g., TCP, ARR, HTTP, CIFS, etc), which illustrates the multi-tenant capabilities of each POP.

In FIG. 6, there are two paths illustrated. The paths are a bypass path and an intercept path. The bypass path may be an IP layer path which acts like a router, and data is passed through to the Core 660 after encryption via IPsec 602 and IP Reassembly 604. Alternatively, in the intercept mode, termination of the TCP connection may be performed inside the service servers 240 starting with per Customer instances of TCP proxies. The traffic may then be sent for further processing as explained in the previous paragraph. Such further processing may return packets that go back to the Edge side 670 or Core side 660. If it is the Core side 660, the client connections may be de-multiplexed 622 into fewer transport connections 624 that implement techniques described in FIG. 3 and the paragraphs discussing FIG. 3. These connections may pass via Core side intercept based UDP connections 624 back to the network switching 245, which determines the route to the appropriate next POP using a router 628. Once the router and next POP are determined the traffic is sent to the Core 660 after the IPSEC 602 and Re-Assembly 604. Returned intercepted traffic coming from Core 660 follows the same path as above to 624 but in reverse order. If the output of the service servers 240 needs to go to the Edge side 670, it may follow the same path described in the previous three paragraphs but in reverse order.

In one embodiment, each customer may have thousands of client connections, originating from hundreds of desktops/laptops from each of the branch office networks 116B-N, that need to be rediscovered as client connections 618 within per customer instance TCP proxies 636. As such, there may be thousands of client connections 618 per branch. Four other proxies are illustrated in FIG. 6. These proxies are the CIFS proxy 632 (e.g., a file system protocol proxy, an ARR proxy 634 (e.g., Advanced Redundancy Removal proxy)), a TCP proxy 636, and a HTTP proxy 638. All proxies operate on data coming through connections described in 618. The QoS 621 may be maintained throughout. In one or more embodiments, the CIFS proxy 632, and the HTTP proxy 638 are other latency and bandwidth mitigation mechanisms that are protocol dependent. It may be noted that the ARR proxy 634 may be protocol independent. In one or more embodiments, these proxies may be supported in the CPE 110 and/or the POPs 106A-N.

The various embodiments described herein eliminate the burden on customers (e.g., organizations) to purchase, deploy, and maintain expensive hardware and/or software at each head office (e.g. the head office 102) and branch office (e.g., the branch offices 104A). By deploying an intelligent network of POPs 106A-N of FIGS. 1-6, enterprise applications and secure data is accelerated through efficient routing, scheduling, and capacity allocation of hardware and software resources because such resources are shared across a large number of customers rather than individually maintained in isolation.

Furthermore, within each of the POPs 106A-N, requests may be removed, coalesced, and/or anticipated to mitigate latency, according to various embodiments. The hardware and/or software in the POPs 106A-N may be application protocol aware by reducing the state diagram of common protocols to alternate forms that remove requests, according to various embodiments. Request elimination may be completed in the cloud (e.g., in the POPs 106A-N) rather than at the head office 102 and/or the branch office 104A-N. Therefore, the various embodiments described herein eliminate significant capital outlays.

In addition, according to the various embodiments, a customer (e.g., head office 102 and the branch offices 104A-N) does not need to purchase end-end networking links (e.g., MPLS) separately according to the various embodiments disclosed herein. Rather, networking services (resources, links) may be tiered (e.g., based on speed of each segment as described in FIG. 4) and shared across a large number of customers through the POPs 106A-N and the core network 112. In other words, the POPs 106A-N instead of the customer's head office and branch office premises, may apply tagged switching (using Insertion Headers like GRE) in the core network 112 to set priorities and QoS (latency, jitter, packet loss) on tagged packets for a large number of customers. As such, these networking services can be shared across the large number of customers.

Furthermore, capacity and load can better be managed across the large number of customers that share these networking services through the various embodiments disclosed herein. The core network 112 may provide priorities for packets between service levels (gold, silver, bronze) or class of service (voice, video, data), according to one embodiment. These priorities will be used for packet queuing, transmission or dropping. As a result, according to one embodiment, jitter, delay and packet loss for WAN connections may be mitigated through the various embodiments described in FIGS. 1-6.

Furthermore, the POPs 106A-N may have additional resources that may be cost prohibitive to smaller customers and may be able to offer such resources as a service to smaller customers. For example, the POPs 106A-N may have packet shaper devices that balance throughput and latency to avoid packet loss (e.g., by prioritizing traffic, delaying lower priority traffic, etc.) therefore providing bandwidth throttling and/or rate limiting functions.

The various embodiments described herein may help to alleviate problems of resource strain caused on individual customers due to protocol independent de-duplication. For example, according to the various embodiments described herein, the POPs 106A-N and the core network 112 may provide support for a variety of protocols (CIFS, MAPI, HTTP/HTTPS, FTP, PRINT, RTMP, RTP, Oracle) for bandwidth reduction and/or communication time reduction, without consuming resources of individual customers. In one or more embodiments, the aforementioned protocol support may be spread across the POPs 106A-N. The protocol support that is spread across the POPs 106A-N and the CPE 110A-N with/without connection termination may be called as split proxies as, the proxy functionality may be split across the POPs 106A-N and CPEs 110A-N. As such, through the various embodiments described in FIGS. 1-6, considerable amount of memory, complex data clustering algorithms if the packet stores are on disk, and considerable amount of compute for fingerprint computation can be shared through the POP 106A-N and the core network 112. The distribution of processing across the resources within a POP 106A-N for these protocols allows a plurality of protocols to be supported across hundreds of customers. This is further explained below.

In addition, the various embodiments described herein eliminate the need for symmetric hardware and software resources at the head office 102 and the branch offices 104A-N. Instead, symmetry may be provided through the cloud through the POPs 106A-N. Therefore, when the additional head offices 102 and/or the branch offices 104A-N are brought on board, there may be no need to purchase, deploy and configure expensive hardware and software. This may eliminate configuration challenges, delays, downtime issues, and/or design complexities caused by installation, maintenance and service of resources when new head offices and/or branch offices are brought on board.

Any equipment at the head-end or branch-end such as the optional CPE 110A-N is non-compulsory (required only if the egress/ingress bandwidth is a bottleneck). Even when used, the optional CPE 110A-N on the head-end or branch-end may only perform WAN de-duplication which may be an important design choice of performing WAN de-duplication at the link with the lowest bandwidth. By making the function of the optional CPEs 110A-N minimal, by appropriately sizing the capability of the CPE to handle the capacity of the branch (or head office) link, the entry cost of providing the service can be dramatically reduced, according to the various embodiments described herein.

In addition, the various embodiments described herein provide a distributed architecture in dealing with application acceleration according to one embodiment. Instead of stuffing all the bandwidth improvement and latency mitigation technologies in single boxes, the problem is distributed across the POPs 106A-N and the core network 112. Therefore, functions that were once required at each of the nodes (e.g., at the head office 102 and the branch offices 104A-N) such as routing, QoS, packet classification, stream shaping, load balancing, WAN data de-duplication, transparent object caching, IPSEC/SSL security, stream shaping, and data encoding can be performed at the POPs 106A-N and in the core network 112 rather than individually by customers, according to the various embodiments disclosed herein. Furthermore, application proxy nodes performing CIFS, HTTP, MAPI, SMTP, etc. can be now shared for a large number of customers rather than individually managed by customers (e.g., eliminating resource constraints at the customer premises).

In addition, it will be appreciated that the application as a service methods and system disclosed herein may enable customers to purchase services when they need them entirely themselves. In other words, the various technologies disclosed herein may be available through a 'self service' model in which customers can elect the acceleration services they require entirely online. Also, it will be appreciated that the application as a service methods and system disclosed herein can be billed on a pay per use basis. In other words, customers may be charged only for the services that they actually use. It will be also appreciated that the application as a service methods and system disclosed herein provide elastic scalability, in which the customers are enabled to scale their application acceleration service requirements based on their business needs quickly, efficiently, and on an as-needed basis. The application as a service methods and system disclosed herein do not require network administrators to perform complicated and tedious hardware management functions to maintain and deploy acceleration hardware at each node, thereby providing ease of management.

The application acceleration services as described in the aforementioned embodiments improves on content acceleration services by extending functionality to accelerating the service of the enterprise application and secure data acceleration as a service. In contrast, solely content acceleration services are limited to public applications and unsecure data in a public network. In other words, it should be noted that 'application acceleration' as described herein refers to both acceleration of services of the enterprise applications and secure data in a private network (e.g., Intranet) and/or acceleration of applications and data of a public network (e.g., Internet). Private Networks have private IP addresses and data in such networks can be routed through the public network using tunnels (e.g., IPSEC tunnel, GRE tunnel, and other similar mechanisms) with public IP address headers. Public Networks have public IP addresses and data in such networks can be routed using a core routing protocol such as the Border Gateway Protocol (BGP). Application acceleration as described herein can operate in both public network and/or private network scenarios.

A few examples that distinguish the application acceleration from a content acceleration are provided. The application acceleration may apply to enterprise applications (e.g., accessible only to employees of a company when communicating through a corporate network having a firewall) to provide business logic support functionality to an enterprise, such as to a commercial organization, which aims to improve the enterprise's productivity and/or efficiency. Furthermore, the application acceleration may provide acceleration of secure data generated from internal applications that are frequently modified (e.g., a Microsoft® Word file stored on a corporate server that is simultaneously accessed and modified by employees of a company from geographically dispersed offices). Such functions are not possible using solely content acceleration services. Unlike content acceleration, the various embodiments disclosed herein for application acceleration may be applicable to the computed documents 122-124, the static documents 127-129 and/or the collaborative documents 118.

Figure 7A:
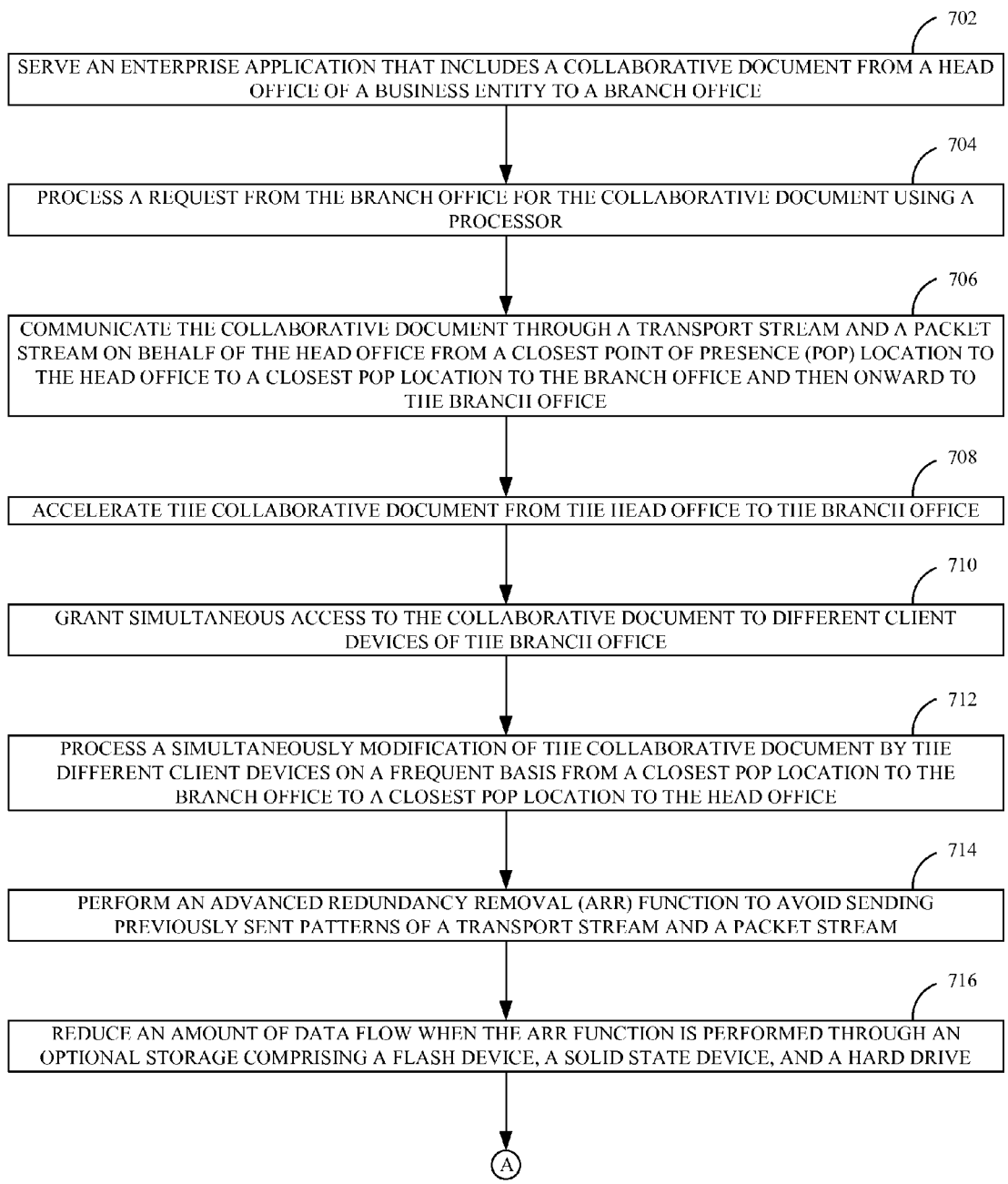
FIG. 7A is a process flow illustrating serving of a collaborative document, a computed document and/or a static document, according to one embodiment.

FIG. 7A is a process flow illustrating serving of the collaborative document 118, the computed document 122-124 and/or the static document 127, according to one embodiment. In operation 702, the enterprise application 120 that includes the collaborative document 118 may be served at the head office 102 of a business entity to the branch office 104A-N. In operation 704, a request may be processed from the branch office 104A-N for the collaborative document 118 using a processor (not shown in Figures). In operation 706, the collaborative document 118 may be communicated through the transport stream or a packet stream on behalf of the head office 102 from the closest POP location to the head office 102 (e.g., the POP 106A) to the closest POP location to the branch office 104A-N and then onward to the branch office 104A-N.

Figure 7B:
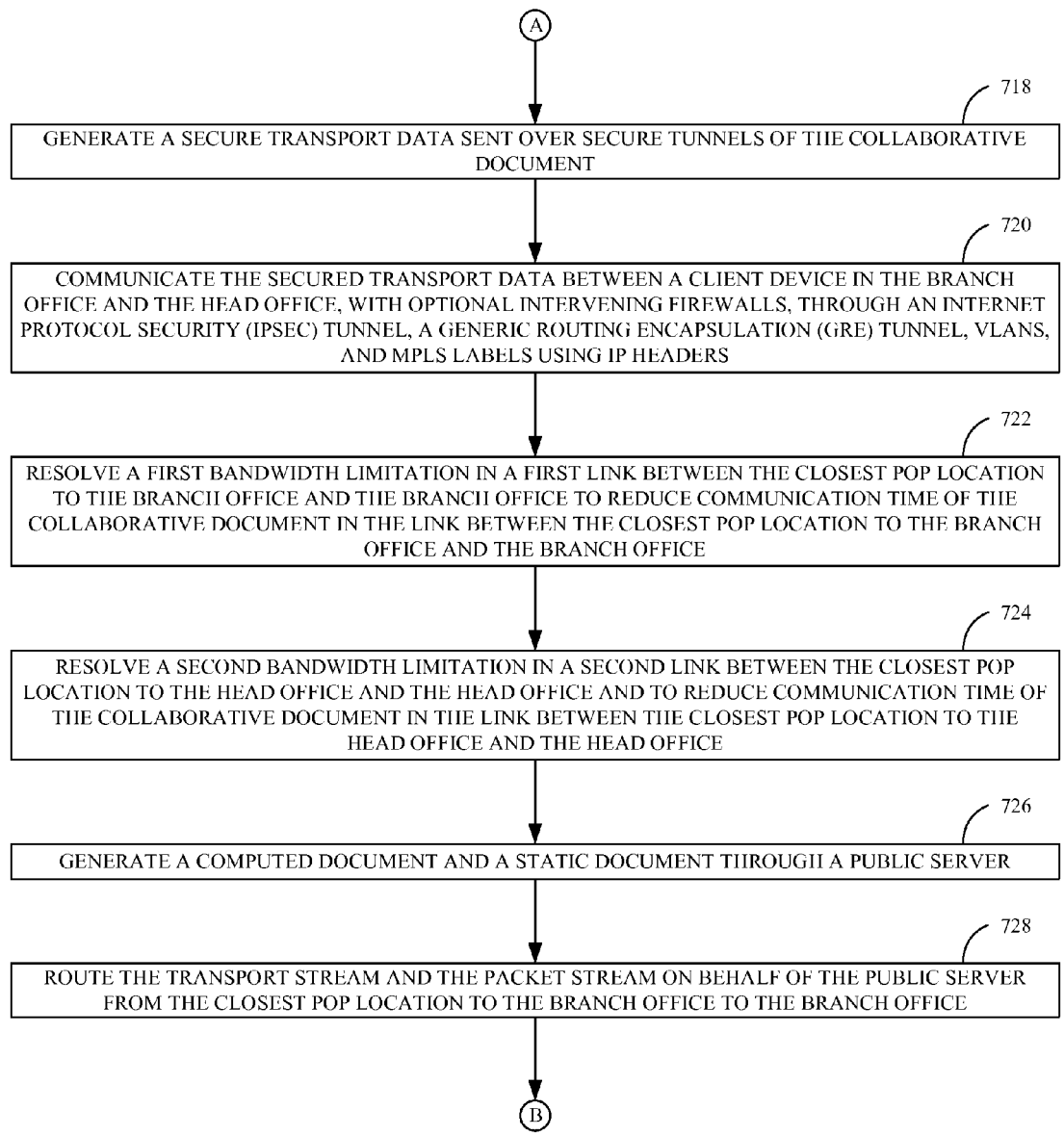
FIG. 7B is a continuation of FIG. 7A illustrating additional operations, according to one embodiment.

In operation 708, the collaborative document 118 may be accelerated (e.g., using multiple POPs 106A-N) from the head office 102 to the branch office 104A-N. In operation 710, simultaneous access to the collaborative document 118 may be granted to different client devices of the branch office 104A-N. In operation 712, a simultaneously modification of the collaborative document 118 may be processed by the different client devices on a frequent basis from a closest POP location to the branch office 104A-N to a closest POP location to the head office 102. In operation 714, the ARR function may be performed to avoid sending previously sent patterns in the transport stream and/or the packet stream. In operation 716, an amount of data flow may be reduced when the ARR function is performed through an optional storage comprising a flash device, a solid state device and a hard drive FIG. 7B is a continuation of FIG. 7A illustrating additional operations, according to one embodiment. In operation 718, a secure transport data of the collaborative document 118 may be generated to be sent over secure tunnels. In operation 720, the secured transport data may be communicated between a client device in the branch office 104A-N and the head office 102 through IPSsec/GRE tunnels, VLANs, and MPLS labels using IP headers with optional intervening firewalls. In operation 722, a first bandwidth limitation may be resolved in a first link between the closest POP location to the branch office 104A-N and the branch office 104A-N and communication time of the collaborative document 118 may be reduced in the link between the closest POP location to the branch office 104A-N and the branch office 104A-N.

In operation 724, a second bandwidth limitation may be resolved in a second link between the closest POP location to the head office 102 and the head office 102 and communication time of the collaborative document 118 may be reduced in the link between the closest POP location to the head office 102 and the head office 102. In operation 726, the computed document 124 and the static document 127 may be generated through the public server 126. In operation 728, the transport stream and/or the packet stream that includes the computed document 124, the collaborative document 118 and/or the static document 127 may be routed on behalf of the public server 126 from the closest POP location to the branch office 104A-N to the branch office 104A-N.

Figure 7C:
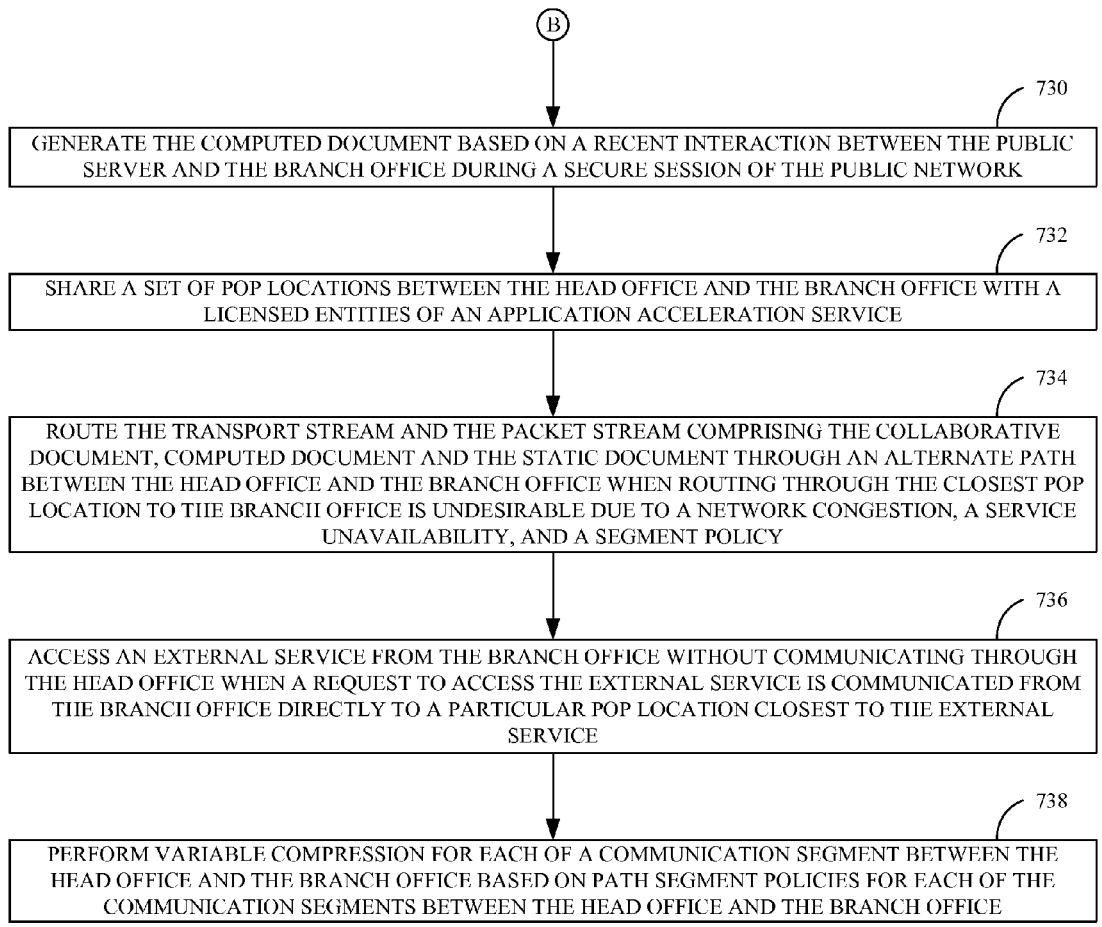
FIG. 7C is a continuation of FIG. 7B illustrating additional operations, according to one embodiment.

FIG. 7C is a continuation of FIG. 7B illustrating additional operations, according to one embodiment. In operation 730, the computed document 122 may be generated based on a recent interaction between the public server 126 and the branch office 104A-N during a secure session of the public network. In operation 732, the set of POP locations may be shared between the head office 102 and the branch office 104A-N with licensed entities of an application acceleration service. The licensed entities may have head offices and branch offices. In operation 734, the transport stream and/or the packet stream that includes the collaborative document 118, the computed document 122-124 and the static document 127 may be routed through an alternate path (e.g., as illustrated in FIG. 3) between the head office 102 and the branch office 104A-N when routing through the closest POP location to the branch office 104A-N is undesirable due to a network congestion, a service unavailability, a segment policy, etc. In operation 736, an external service may be accessed from the branch office 104A-N without communicating through the head office 102 when a request to access the external service is communicated from the branch office 104A-N directly to a particular POP location closest to the external service (e.g., as illustrated in FIG. 3). In operation 738, segments may be variably compressed between POP locations between the head office 102 and the branch office 104A-N based on segment policies.

Figure 8:
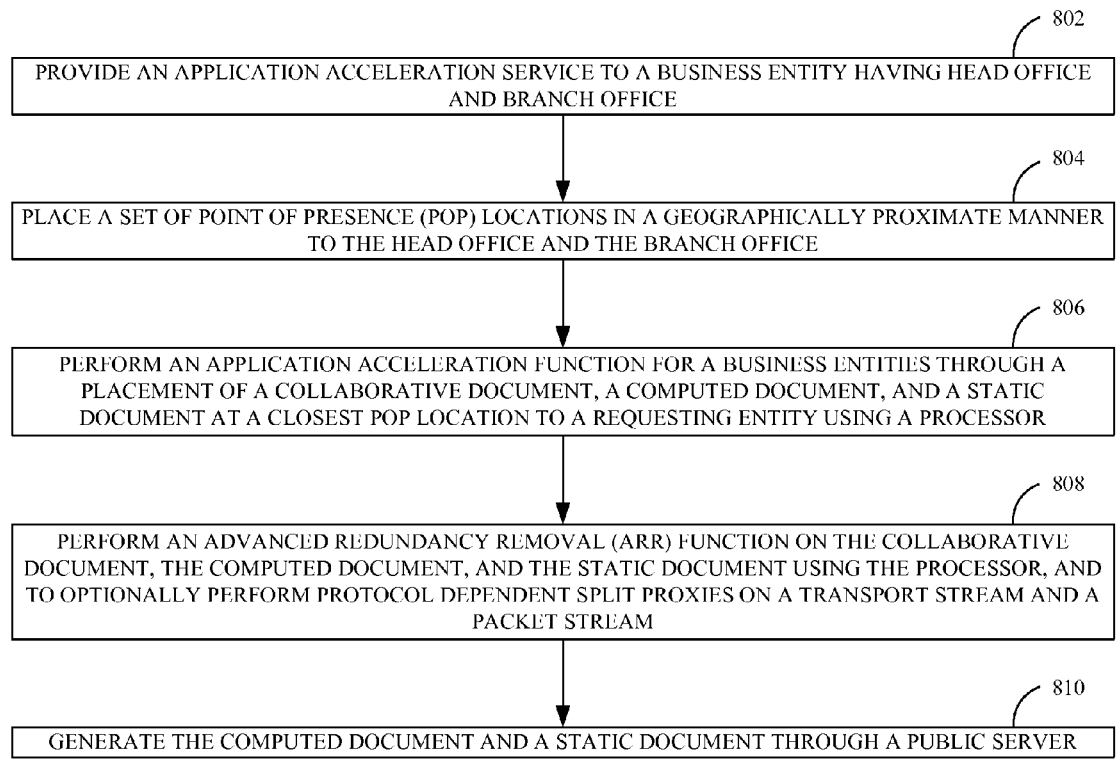
FIG. 8 is a process flow of providing application acceleration as a service, according to one embodiment.

FIG. 8 is a process flow of providing application acceleration as a service, according to one embodiment. In operation 802, an application acceleration service may be provided to a business entity having the head office 102 and branch offices 104A-N. In operation 804, the set of Pops 106A-N may be placed in a geographically proximate manner to the head office 102 and the branch office 104A-N. In operation 806, an application acceleration function may be performed for the business entities through a placement of the collaborative document 118, the computed document 122 and the static document 127 at a closest POP location to the requesting entity using a processor. In operation 808, the ARR function may be performed on the collaborative document 118, the static document 127 and the computed document 122 using the processor. In operation 810, the computed document may be generated through the public server 126.

FIG. 9 illustrates a core services provided by application acceleration as a service 950, according to one or more embodiments. In particular, FIG. 9 illustrates functions 901, services 902, multi-tenancy 903, multisegment 904, protocol independent acceleration 905, routing 906, network of POPs 908, protocol dependent acceleration 909, transport 910, elastic capacity 912, policies 914, latency/speed 916, compression/decompression 918, security 920, hub/hub 922, hub/spoke 924, spoke/spoke 926, pay per use 928, self service 929, no hardware management 930, shared POPs, network and software 931, performance and fault isolation 932, and quality of service by traffic/customer 933, according to one or more embodiments.

The functions 901 in the application acceleration as a service may be implemented through protocol independent acceleration 905 and the protocol dependent acceleration 909. In one or more embodiments, the protocols that implement the protocol independent acceleration include the ARR, the TCP proxy, etc. In one or more embodiments, the protocols that implement the protocol dependent acceleration include the single and/or split protocol proxies.

The services 902 provided by the application acceleration as a service 950 may include network of POPs 908, the transport 910, elastic capacity 912, pay per use 928, self service 929 and no hardware management 930. In one or more embodiments, the network of POPs may be installed in various locations of the world. In some embodiments, the POPs 106A-N may be located at Internet exchange points and co-location centers. The POPs 106A-N may be a group of servers that communicate the collaborative document between the office locations (e.g., that include head office 102 and multiple branch offices 104A-N). The POPs 106A-N may support different configurations. For example, the configurations may include, but not limited to hub/hub, hub/spoke, and spoke/spoke. In one or more embodiments, the POPs 106A-N may be connected to each other directly or indirectly. However, it should be noted that the POPS 106A-N may be well networked to provide application acceleration through finding alternative paths to reduce time of data communication. The transport 910 services may include secure transport of data and communication of the secured data (e.g., collaborative document 118 and the enterprise application 120) between the offices based on any of the aforementioned configurations through the Internet Protocol Security (IPsec) tunnel, the Generic Routing Encapsulation (GRE) tunnel, VLANs, and MPLS labels using IP headers with optional intervening firewalls. The services described herein may be provided to customers on the pay per use 928 basis based on service levels (gold, silver, bronze) or class of service (voice, video, data). In addition, the customers may be charged only for the services that they actually use.

The services 902 disclosed herein also provides elastic scalability 912, whereby allowing the customers to scale their application acceleration service requirements based on their business needs quickly, efficiently, and/or on an as-needed basis. The self service 929 may enable customers to avail services when they need them entirely themselves (e.g., self service model). The services 902 provides ease of no hardware management 930, thereby eliminating a requirement of administrators to perform complicated and tedious hardware management functions to maintain and deploy acceleration hardware at each node.

The application acceleration as a service may also support multi tenancy 903 in which it provides an option to share POPs, network and software 931, performance and fault isolation 932, and quality of service by traffic/customer. The multi-tenancy 903 may enable sharing of the POPs between the customers, thereby enabling sharing of the network and software between the customers with high security (e.g., as illustrated in FIG. 3). Also the multi-tenancy 903 may provides performance and fault isolation 932 capabilities to each of the customers even while sharing the resources. Furthermore, the multi-tenancy 903 may provide quality of service by traffic per customer individually even while providing sharing hardware and software between the customers.

The application acceleration as a service 950 may be performed using the POP locations 106A-N by communicating the secure data through the core networks 112. The application acceleration services disclosed herein do not require tags to be changes in documents (collaborative, computed, and static) to be accelerated. The application acceleration services disclosed herein can apply transparent caching as well as tag changes to point to POP locations closest to a requesting entity. For computed and static documents, the various embodiments disclosed herein may be differentiated from other methods in that multisegment policies (e.g., compression, window sizing, and securities) can be applied to scenarios in which computed and static documents are accelerated. The various routing technologies disclosed herein may apply a GRS tunnel which uses IP layer 3 to emulate MPLS like functionalities. As a result, the various embodiments disclosed herein may serve as WAN optimize replacement services in addition to application acceleration services.

The policies 914 in the multisegment 904 may include assigning the policies between the segments (e.g., see FIG. 4) dynamically. In one or more embodiments, the policies may be assigned dynamically based on requirements to accelerate the documents. In addition, the policies may be variable per segment. The latency/speed 916 may be achieved through TCP window. In one or more embodiments, TCP window may maintain buffers based on requirements of latency and speed. In one or more embodiments, the aforementioned embodiments implement variable compression per segment. In one or more embodiments, the TCP proxies may be performed with varying policies for one or more of the TCP windows, buffering and/security. The aforementioned embodiments describe the compression/decompression 918 policies being implemented based on requirements (e.g., speed of the link, capability of the link) in the communication link (e.g., see FIG. 4). The security 920 services may include communication of secure data through Internet Protocol Security (IPsec) tunnel, a Generic Routing Encapsulation (GRE) tunnel, VLANs, and MPLS labels using IP headers with optional intervening firewalls. In one or more embodiments, the communication may be through the private networks.

Figure 11:
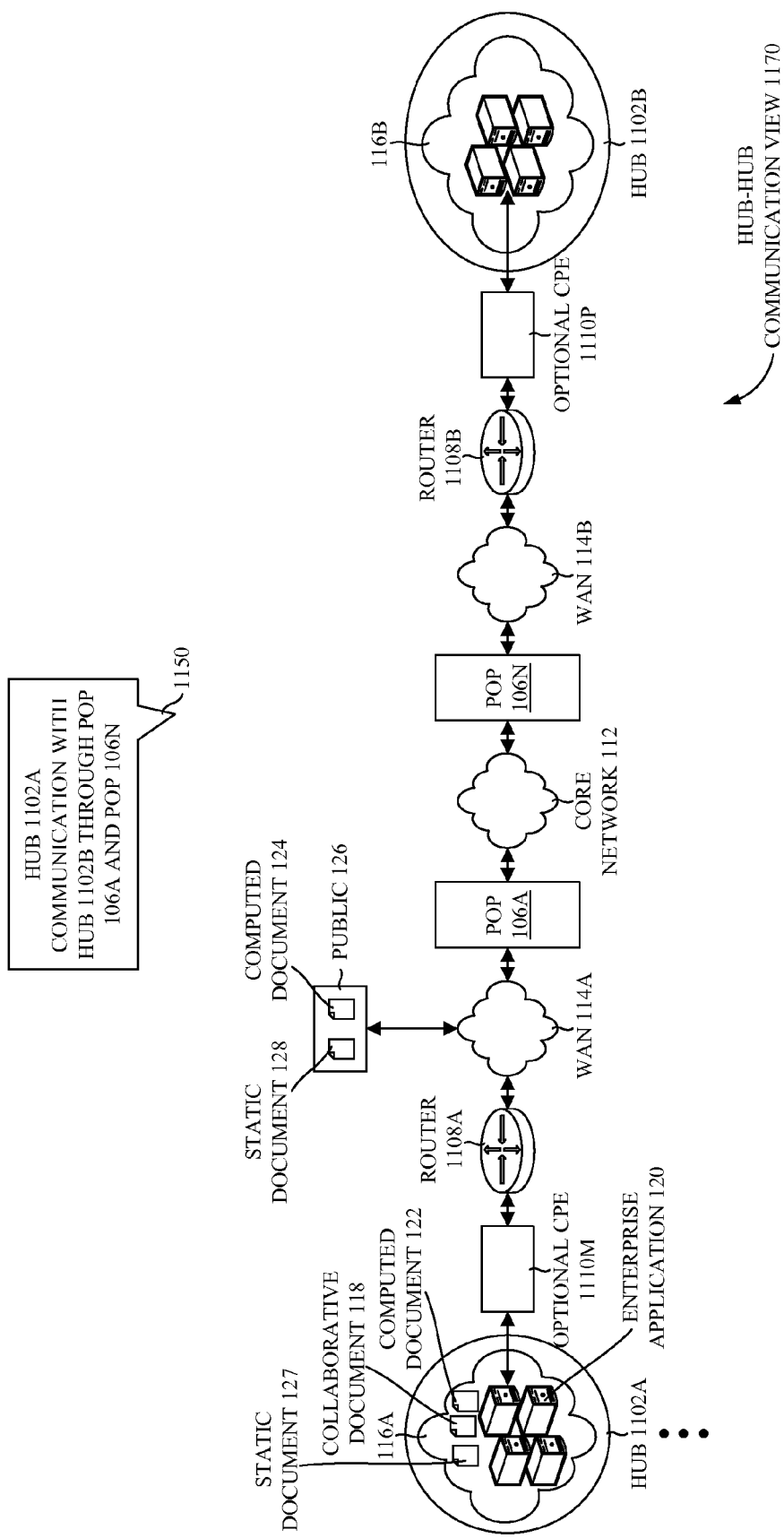
FIG. 11 is a hub/hub communication view, according to an example embodiment.

The routing services 906 may include configurations that the system supports to enable communication of the secure data between end nodes (e.g., offices). The configuration may include hub/hub, hub/spoke and spoke/spoke. The hub/hub configuration 922 enables communication between the service providing entities. For example, the head office communicating with another head office located at different location geographically or communication in multi tenancy configuration. In one or more embodiments, the entities in the hub/hub configuration 922 may be serving entities. An example embodiment of the hub/hub configuration 922 is illustrated in FIG. 11. The hub/spoke configuration 924 supports the communication between the serving entity and the requesting entities. For example, the head office 102/the branch office 104A-N configuration may be the hub/spoke configuration 924. In the example embodiment, the head office 102 may be the serving entity and the branch office may be the requesting entity. An example embodiment of the hub/spoke configuration 924 is illustrated in FIG. 1. The spoke/spoke configuration 926 supports the communication between the requesting entities. For example, the communication between the branch offices 104A-N is a spoke/spoke configuration. Example embodiment of the spoke/spoke configuration 926 may be illustrated in FIG. 12.

Figure 10:
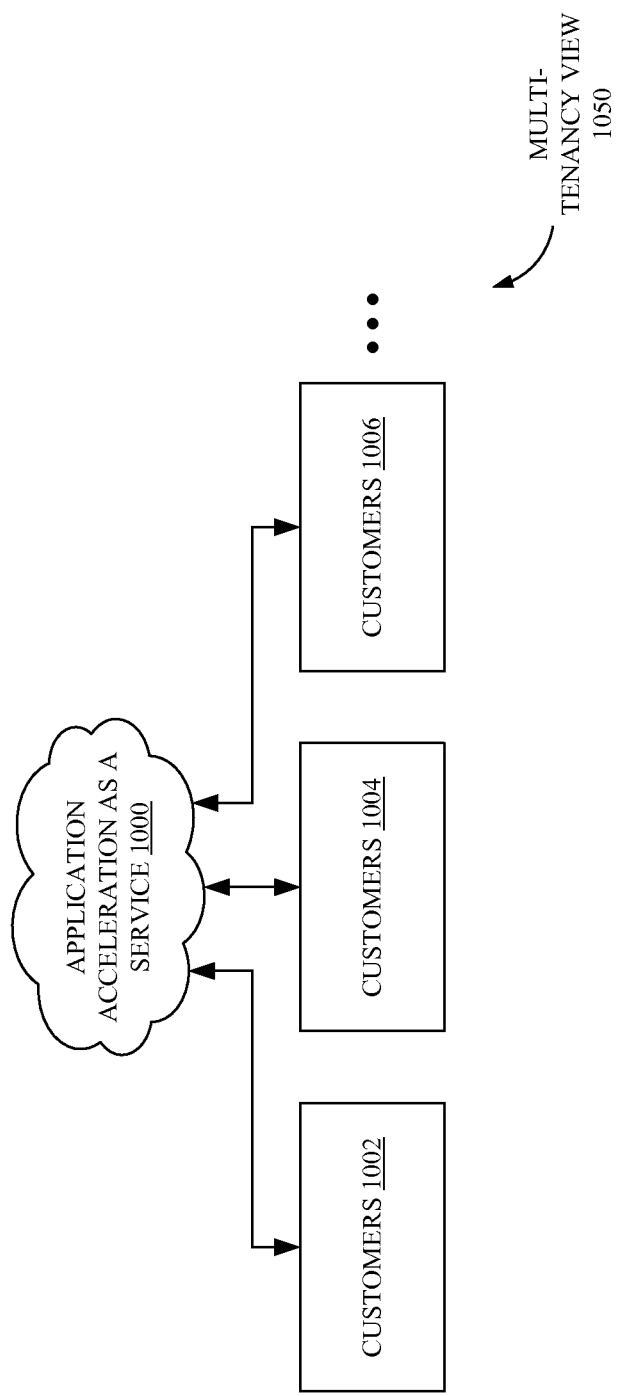
FIG. 10 is a multi tenancy view illustrating a number of customers using application acceleration as service, according to one or more embodiments.

FIG. 10 is a multi tenancy view illustrating a number of customers using application acceleration as service 1000, according to one or more embodiments. In particular, FIG. 10 illustrates an application acceleration as a service 1000, and customers 1002-1006 availing the application acceleration as a service 1000, according to one or more embodiments. In one or more embodiments, the application acceleration as a service 1000 may be shared among the customers 1002-1006 also. In one or more embodiments, the customers 1002-1006 may avail the application acceleration as service through licensing. The customers 1002-1006 sharing the application acceleration as a service may enable faster communication within their entity as well as with the other customers who use the application acceleration as a service 1000. As a result, the customers 1002-1004 may leverage both a shared software and a shared hardware infrastructure of an application acceleration service provider.

FIG. 11 is a hub/hub communication view 1170, according to one embodiment. A hub 1102A may be any entity that provides services to other entities. For example, the hub 1102A may be the head office 102. In another example, the hub 1102A may also be a service provider with no branch offices. Similarly, a hub 1102B may be an entity that may provide services to other entity or may be limited to provide services within the entity itself. In one or more embodiments, the hubs 1102A-B may both be service providers. In one example embodiment, any of the hub of the hubs 1102A-B may require services from the other hub. For example, the hub 1102B may require collaborative document 118 from the hub 1102A. In operation 1150, the hub 1102B may communicate with the hub 1102A for the collaborative document 118 though the POP 106N via the POP 106B. The hub 1102A may communicate the collaborative document 118 in the stream (e.g., transport stream, packet stream) to the hub 1102B through the POP 106N via the POP 106A in a secure channel such as the Internet Protocol Security (IPsec) tunnel.

Figure 12:
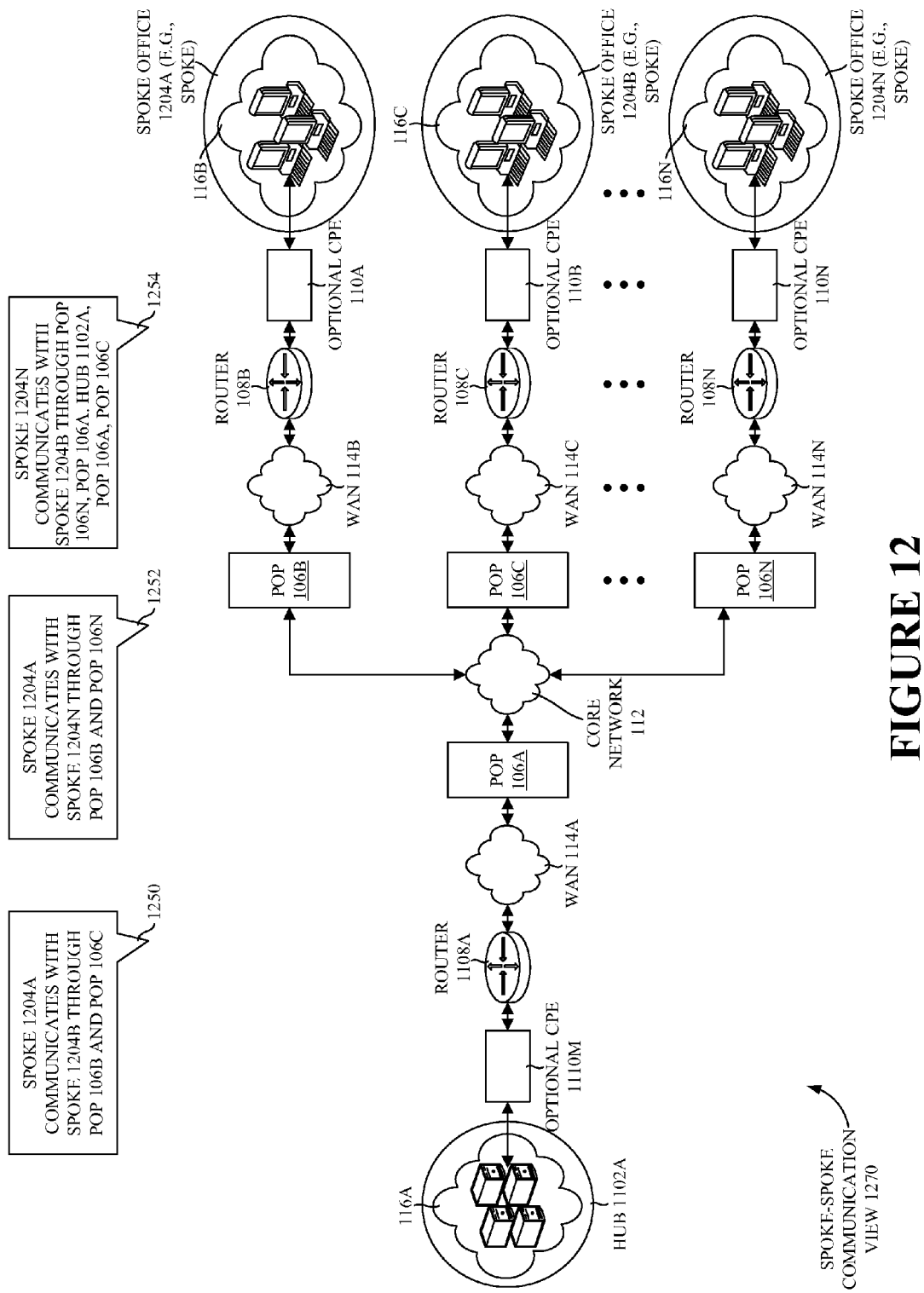
FIG. 12 is a spoke/spoke communication view, according an example embodiment.

FIG. 12 is a spoke/spoke communication view 1270, according to one embodiment. In one or more embodiments, a spoke 1024A-N may be the entities or the part of entities which requests for the services. In one or more embodiments, the spokes 1204A-N may be branch offices 104A-N that request for services. In one or more embodiments, one or more spokes may require communication or services from the other spokes. The system as described herein may enable the communication between each of the spoke with the other spokes. Therefore, the spokes 1204A-N may communicate with each other through the nearest POPs 106A-N. In an example embodiment, the spoke 1204A may require a document such as static document from the spoke 1204B. However, the spoke 1204B may be situated in a different location geographically. In an embodiment, in operation 1250, the spoke 1204A may communicate with the spoke 1204B through the POP 106B via the POP 106C. By an attribute of the system described herein, the required static document may be communicated in the stream (e.g., packet stream) to the spoke 1204B directly through the nearest POP 106C via the POP 106B in a secure channel. In operation 1252, the spoke 1204A may communicate with the spoke 1204N through the POP 106N via the POP 106B, when there is a similar requirement for service from the spoke 1204N. In one or more embodiments, the spoke may communicate with another spoke through the hub. In operation 1254, the spoke 1204N may communicate with spoke 1204B through POP 106C via the POP 106N, the hub 1102A, and POP 106C.

Figure 13:
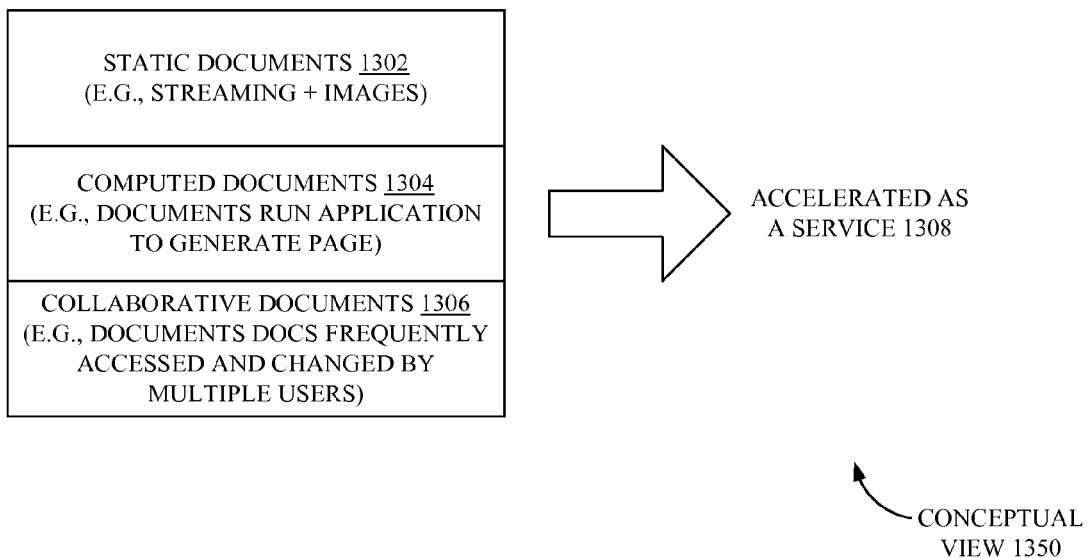
FIG. 13 is a conceptual view that illustrates a few types of documents that are accelerated using the acceleration as a service, according to one or more embodiments.

FIG. 13 is a conceptual view that illustrates a few types of documents that are accelerated using the acceleration as a service, according to one or more embodiments. The enterprise application 120 of a serving entity (e.g., head office 102) as mentioned in above figures may generate the static documents 1302, computed documents 1304, collaborative documents 1306, etc. The aforementioned enterprise application 120 may also communicate the above said documents based on the request from the requesting entities. In one embodiment, the requesting entity may request for any of the static documents 1302 (e.g., streaming data, images, static content, etc.), the computed documents 1304 (e.g., HTML, XML, etc.), the collaborative documents (e.g., e.g., Microsoft® Word documents, Microsoft® Excel documents, documents that are frequently accessed and modified by number of users), etc. from the serving entity. The serving entity may communicate the requested document in a stream in a secure channel through the POPs that provide application acceleration as a service 1308.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed:
1. A system comprising:
 a requesting entity;
 a Wide Area Network (WAN);
 a serving entity configured to serve an application comprising at least one of a collaborative document, a computed document generated at runtime, and a static document prepared a priori,
wherein the application is configured to be shared with the requesting entity in accordance with a request therefor, and
wherein the serving entity and the requesting entity are configured to communicate through the WAN; and
a network of a number of Point of Presence (POP) locations between the serving entity and the requesting entity,
wherein the network of the number of POP locations is configured to communicate the at least one of the collaborative document, the computed document, and the static document on behalf of the serving entity from a closest POP location to the serving entity to a closest POP location to the requesting entity and then onward to the requesting entity,
wherein each of the number of POP locations comprises a switching engine and an edge engine implemented therein to provide a WAN optimization and an application acceleration during the communication of the at least one of the collaborative document, the computed document, and the static document on behalf of the serving entity,
wherein the switching engine and the edge engine are configured to enable a multi-tenancy in the each of the number of POP locations,
wherein a resource allocation for the switching engine and the edge engine is on a per-customer basis,
wherein the switching engine and the edge engine are scalable with a number of load balancers,
wherein a WAN optimization capability and an application acceleration capability of the each of the number of POP locations enable a distribution of a number of tasks associated therewith across the WAN,
wherein at least one of the serving entity and the requesting entity is configured to generate a secure transport data to be transmitted over a number of secure tunnels of the at least one of the collaborative document, the computed document, and the static document between a number of intervening firewalls such that a traffic is routed securely through the network of the number of POP locations toward a destination,
wherein the network of the number of POP locations is implemented with a multi-segment architecture, and
wherein the number of secure tunnels comprises a private transport of a packet with an unaltered Internet Protocol (IP) address through at least one of a Generic Routing Encapsulation (GRE), an Internet Protocol Security (IPsec), a Multiprotocol Label Switching (MPLS), and a Virtual Local Area Network (VLAN),
wherein the collaborative document is accessible and simultaneously modifiable by a plurality of users at the requesting entity.

2. The system of claim 1:
wherein at least one of:
the application comprises an internal application of an enterprise,
the serving entity and the requesting entity are configured to securely access the application through a private network using at least one of a number of public addresses of a number of source routers along with a number of destination routers, a number of pools of a number of addresses represented by the number of intervening firewalls, an MPLS label, and a VLAN tag, and
the application is configured to be executed at any of the number of POP locations of the network of the number of POP locations.

3. The system of claim 2, further comprising:
a Customer Premise Equipment (CPE) device and a router coupled to the at least one of the serving entity and the requesting entity,
wherein the CPE device and the router are configured to at least one of:
perform an Advanced Redundancy Removal (ARR) function to avoid transmitting a duplicate information in at least one of a transport stream and a packet stream,
perform a number of Transmission Control Protocol (TCP) proxies, wherein a number of varying policies are used for at least one of a number of TCP windows, a buffering, and a security,
perform a number of protocol dependent split proxies on the at least one of the transport stream and the packet stream,
generate the secure transport data to be transmitted over the number of secure tunnels of the at least one of the collaborative document, the computed document, and the static document, and
communicate the secure transport data between a client device in the requesting entity and another client device in the serving entity through the number of secure tunnels between the number of intervening firewalls.

4. The system of claim 3:
wherein the CPE device is further configured to at least one of:
resolve a first bandwidth limitation in a first link between the closest POP location to the requesting entity and the requesting entity along with reducing a communication time of the at least one of the collaborative document, the computed document, and the static document in the first link between the closest POP location to the requesting entity and the requesting entity, and
resolve a second bandwidth limitation in a second link between the closest POP location to the serving entity and the serving entity along with reducing the communication time of the at least one of the collaborative document, the computed document, and the static document in the second link between the closest POP location to the serving entity and the serving entity.

5. The system of claim 3, further comprising:
a storage associated with at least one of the network of the number of POP locations and the CPE device to reduce an amount of data flow when the ARR function is performed,
wherein the storage comprises at least one of a flash device, a solid state device, and a hard drive.

6. The system of claim 3, further comprising:
a public server configured to generate at least one of the computed document and the static document,
wherein the requesting entity is configured to request the at least one of the computed document and the static document from the serving entity through the at least one of the transport stream and the packet stream, and wherein the network of the number of POP locations is configured to route the at least one of the transport stream and the packet stream on behalf of the public server from a closest POP location to the public server to the closest POP location to the requesting entity to the requesting entity.

7. The system of claim 6, further comprising at least one of:
a plurality of serving entities, a plurality of public servers, and a plurality of requesting entities.

8. The system of claim 6:
wherein the serving entity and the requesting entity are configured to communicate with each other through at least one of the private network and a public network, and
wherein the public server and the requesting entity are also configured to communicate with each other through the at least one of the private network and the public network.

9. The system of claim 8:
wherein the computed document is generated based on a recent interaction between the public server and the requesting entity during a secure session of the public network.

10. The system of claim 1:
wherein the network of the number of POP locations is shared by a plurality of licensed entities of an application acceleration service,
wherein each of the plurality of licensed entities has a number of serving entities and a number of requesting entities, and
wherein the each of the plurality of licensed entities leverages a shared software infrastructure and a shared hardware infrastructure of a service provider associated with the application acceleration service.

11. The system of claim 3:
wherein an alternate path is used to route the at least one of the transport stream and the packet stream that comprises the at least one of the collaborative document, the computed document, and the static document between the serving entity and the requesting entity when a routing through the closest POP location to the requesting entity is undesirable due to at least one of a network congestion, a service unavailability, and a segment policy.

12. The system of claim 1:
wherein the requesting entity is configured to access an external service without communicating through the serving entity when a request to access the external service is communicated from the requesting entity directly to a particular POP location closest to the external service.

13. The system of claim 3:
wherein a compression for a communication segment between the each of the number of POP locations of the network of the number of POP locations is variable based on a path segment policy between the each of the number of POP locations of the network of the number of POP locations, the CPE, and the serving entity.

14. A system comprising:
a number of serving entities;
a WAN;
a number of requesting entities configured to communicate with the number of serving entities through the WAN;
a network of a number of POP locations geographically proximate to the number of serving entities and the number of requesting entities,
wherein each of the number of POP locations comprises a switching engine and an edge engine implemented therein to provide a WAN optimization and an application acceleration during a communication of at least one of a collaborative document, a computed document, and a static document of an application served through the number of serving entities to a POP location closest to a requesting entity,
wherein the switching engine and the edge engine are configured to enable a multi-tenancy in the each of the number of POP locations,
wherein a resource allocation for the switching engine and the edge engine is on a per-customer basis,
wherein the switching engine and the edge engine are scalable with a number of load balancers,
wherein a WAN optimization capability and an application acceleration capability of the each of the number of POP locations enable a distribution of a number of tasks associated therewith across the WAN,
wherein the collaborative document is accessible and simultaneously modifiable by a plurality of users at the number of requesting entities,
wherein the computed document is generated at runtime,
wherein the static document is prepared a priori, and
wherein the network of the number of POP locations is implemented with a multi-segment architecture; and
a CPE device of at least one of a serving entity and the requesting entity, wherein the CPE device is configured to:
perform an ARR function on the at least one of the collaborative document, the computed document, and the static document,
perform a number of TCP proxies with a number of varying policies for at least one of a number of TCP windows, a buffering, and a security,
perform a number of protocol dependent split proxies on at least one of a transport stream and a packet stream associated with the at least one of the collaborative document, the computed document, and the static document, and
generate a secure transport data to be transmitted over a number of secure tunnels of the at least one of the collaborative document, the computed document, and the static document between a number of intervening firewalls such that a traffic is routed securely through the network of the number of POP locations toward a destination,
wherein the ARR function enables an avoidance of a transmission of a duplicate information in the at least one of the transport stream and the packet stream.

15. A method comprising:
providing a capability to communicate between a serving entity and a requesting entity through a WAN;
serving, through a processor, an application comprising at least one of a collaborative document, a computed document generated at runtime, and a static document prepared a priori from the serving entity to the requesting entity in accordance with an appropriate request from the requesting entity based on the provided capability to communicate through the WAN;

communicating the at least one of the collaborative document, the computed document, and the static document through a network of a number of POP locations based on at least one of a transport stream and a packet stream on behalf of the serving entity from a closest POP location to the serving entity to a closest POP location to the requesting entity and then onward to the requesting entity;

providing a WAN optimization capability and an application acceleration capability across the WAN during the communication of at least one of the collaborative document, the computed document, and the static document on behalf of the serving entity through the network of the number of POP locations by implementing each of the number of POP locations with a switching engine and an edge engine therein, wherein the switching engine and the edge engine are configured to enable a multi-tenancy in the each of the number of POP locations, wherein a resource allocation for the switching engine and the edge engine is on a per-customer basis, and wherein the switching engine and the edge engine are scalable with a number of load balancers;

generating, through at least one of the serving entity and the requesting entity, a secure transport data to be transmitted over a number of secure tunnels of the at least one of the collaborative document, the computed document, and the static document between a number of intervening firewalls such that a traffic is routed securely through the network of the number of POP locations toward a destination, wherein the number of secure tunnels comprises a private transport of a packet with an unaltered IP address through at least one of a GRE, an IPsec, a MPLS, and a VLAN; and implementing the network of the number of POP locations with a multi-segment architecture, wherein the collaborative document is accessible and simultaneously modifiable by a plurality of users at the requesting entity.

* * * * *